United States Patent [19]

Mecklenborg

[11] 3,832,046

[45] Aug. 27, 1974

[54] PANORAMIC PROJECTOR AND CAMERA

[75] Inventor: Richard A. Mecklenborg, Binghamton, N.Y.

[73] Assignee: The Singer Company, Binghamton, N.Y.

[22] Filed: Nov. 13, 1972

[21] Appl. No.: 305,792

[52] U.S. Cl. .................................... 352/69, 35/12 N
[51] Int. Cl. ............................................ G03b 37/00
[58] Field of Search ............... 352/69, 132; 35/12 N

[56] References Cited

UNITED STATES PATENTS 3,191,182 6/1965 Caldwell .............................. 352/69

*Primary Examiner*—Monroe H. Hayes
*Attorney, Agent, or Firm*—Francis L. Masselle; James C. Kesterson

[57] ABSTRACT

A panoramic motion picture projector useful in flight simulators and in the entertainment field is shown. A curved cylindrical segment of film which typically subtends 180° at the film gate contains a full 360° of picture information thus enabling projection of a complete panoramic image. The film segment is scanned by a slit of light revolving about the axis of curvature of the segment and the resulting image is converted to a rotating radial pattern having said axis as its center. In one embodiment, the speed of rotation of the radial pattern is increased to cause an input rotation of 180° to cover 360°, and the pattern is then restored to the cylindrical format by a scanning projection head for projection on a cylindrical screen. For use in situations, e.g., in flight simulators, where perspective transformations are required, means are provided to tilt the scanning slit in order to pick up the required image information and then to detilt it afterwards. Translation corrections are then obtained by Scheimpflug and anamorphic correction means and placed in the optical path prior to projection. A panoramic camera is also described.

49 Claims, 20 Drawing Figures

15
23
13
17
20
11
21
19
19

13
27
31
11
25
29
19

A
11
31
29

A
11
29

FILM DRIVE SERVO
LIBRATION GENERATOR
156
158
110
124
130
128
132
134
133
136
138
116
122
140
144
142
146
174
120
126
114
118
176
125
150
148
154
152

LASER
SERVO
220
222
224
148
147
152
148'
244
226
230
232
234
236
228
238
240
242
246
248
254
256
250
252
258
260
262
264
266
268
270
272
274
276
278
280
282
284
286
288
225
303
301
290
292
294
296

PANORAMIC PROJECTOR AND CAMERA

CROSS-REFERENCES TO RELATED APPLICATIONS

This is a continuation of an application of Richard A. Mecklenborg for U.S. Letters Patent, Ser. No. 200,755, filed Nov. 22, 1971.

BACKGROUND OF THE INVENTION

1. Field of the Invention

This invention relates to panoramic cameras and projectors in general and more particularly to an improved panoramic projector useful in flight simulator visual systems.

2. Description of the Prior Art

In aircraft flight simulators and other training devices it is often necessary to provide a visual system for presenting to the operator (trainee) a realistic scene representing an environment appropriate to the position, condition, attitude, etc., of the simulated aircraft at any given moment. Various types of visual systems have been developed including one, known as a "camera-model", which utilizes closed-circuit television and a terrain model. The camera is mounted for displacement in six degrees of freedom and positioned to view the terrain model. The position and attitude of the camera relative to the model is controlled in response to manipulation of the simulator controls and the resulting scene displayed to the trainee on a CRT.

Camera-model visual systems have a number of drawbacks, perhaps the most important one of which is the limited brightness and resolution of the TV display together with the presence of raster lines which detract from its realism. In addition, a terrain model of suitable scale can be accommodated only in a very large room or a specially designed building.

These and other disadvantages of camera-model systems are avoided by visual systems using motion picture film as an image source. The film is made with a forward-looking camera mounted in an aircraft which flies a planned mission over the desired terrain, making landings and take-offs at an actual airport of choice while following, as closely as possible, an ideal flight profile. The film thus obtained is projected for the trainee in the simulator through controllable anamorphic optical systems responding to simulator control movements to distort the images so as to effect an apparent change in the viewpoint of the trainee corresponding to that which would occur in the out-of-the-windshield view from a real aircraft in response to the same control movements. Visual systems of this type are commercially available under the trademark VAMP from The Singer Company and are more fully described in a group of patents, typified by U.S. Pat. No. 2,999,322, granted to H. S. Hemstreet and assigned to the same assignee as the present invention.

While the VAMP visual system is far superior in realism to camera-model types, it is limited in its field of view.

Ideally, a full 360° field of view should be provided to a trainee and while various panoramic projectors have been developed which will provide such a view, none include means to alter the apparent perspective point as is done in the VAMP visual system and as is required for flight simulation.

The present invention provides a film-based image generation and display system which has the advantages of providing both a panoramic view and perspective transformations, making it ideally suited for flight simulation.

To accomplish the desired perspective transformations, two well-known techniques are applied in the projection of the film as will be described below; these are the Scheimpflug and anamorphic corrections. Neither is explained in full detail herein. The Scheimpflug correction is described in U.S. Pat. No. 751,347 granted to T. Scheimpflug on Feb. 2, 1904. Anamorphic distortion is discussed in British Patent No. 8512 granted to P. Rudolph on Mar. 18, 1899.

The principal object of this invention is to provide a panoramic projector capable of altering the apparent perspective of the projected image.

Another object is to provide a motion picture image which covers a full 360° field of view.

A further object is to provide an improved panoramic projector in which differential gearing required is minimized by use of an endless loop film drive.

An additional object is to provide a novel panoramic projector useful in flight simulators.

Other objects of the invention will in part be obvious and will in part appear hereinafter.

SUMMARY OF THE INVENTION

Briefly stated, the invention contemplates a panoramic projector in which a cylindrical segment of image-bearing film is incrementally projected onto a coaxially surrounding cylindrical screen by a radially-directed scanning narrow beam or light slit normally extending parallel to and rotating about the axis of curvature of the film segment. To simulate a lateral displacement of the perspective point of projection from the perspective point from which the film image was recorded, the light slit is skewed prior to scanning the film and restored to its normal attitude thereafter, the degree of skewing being a predetermined function of the extent of the simulated lateral displacement of the perspective points and of the altitude from which the film image was recorded.

The resulting image modulated slit of light is then optically converted to a polar coordinate format with the slit rotating in a radial pattern, the image modulated slit of light coinciding with a first radial axis of the pattern produced when scanning that image portion which is in the plane of the lateral displacement and coinciding with a second radial axis of the pattern, perpendicular to the first, produced when scanning that image portion which is in a plane perpendicular to the plane of lateral displacement. A Scheimpflug correction is performed on the pattern with the correction axis aligned with the first axis, the amount of correction being a function of lateral displacement, and an anamorphic distortion is performed on the result as a function of lateral displacement with the magnification axis along the second axis.

If the perspective point of projection is also displaced in altitude from the film image recording viewpoint, a further anamorphic distortion is performed on the radial pattern whereafter the rotating slit is optically restored to parallelism with its axis of rotation.

BRIEF DESCRIPTION OF THE DRAWINGS

FIGS. 1*a* to 5 are utilized to explain the principles of the invention:

FIG. 1*a* is a perspective view of the mapping of points on a plane surface onto a first cylinder;

FIG. 2 shows the resultant mapping of the same points of FIG. 1*a* onto a second cylinder laterally displaced from the first cylinder;

FIG. 3 shows the result of rotating the plane intersecting the aforesaid points and their projections in FIG. 2 to the vertical;

FIG. 4 shows the product of performing a Scheimpflug distortion on the final projection of FIG. 3; and FIG. 5 shows the types of projections resulting on the second cylinder for points in planes having various angular relationships to the direction of lateral displacement.

FIGS. 7–9*c* are utilized to explain the principles and operation of the present invention:

FIG. 7 is a side view of the mapping of points onto a cylinder displaced from a desired vantage point;

FIG. 8 is a plan view of the mapping of the same points of FIG. 7;

FIG. 9*c* shows the result of an anamorphic distortion performed on FIG. 9*b*.

DESCRIPTION OF THE PREFERRED EMBODIMENTS

Figure 1:
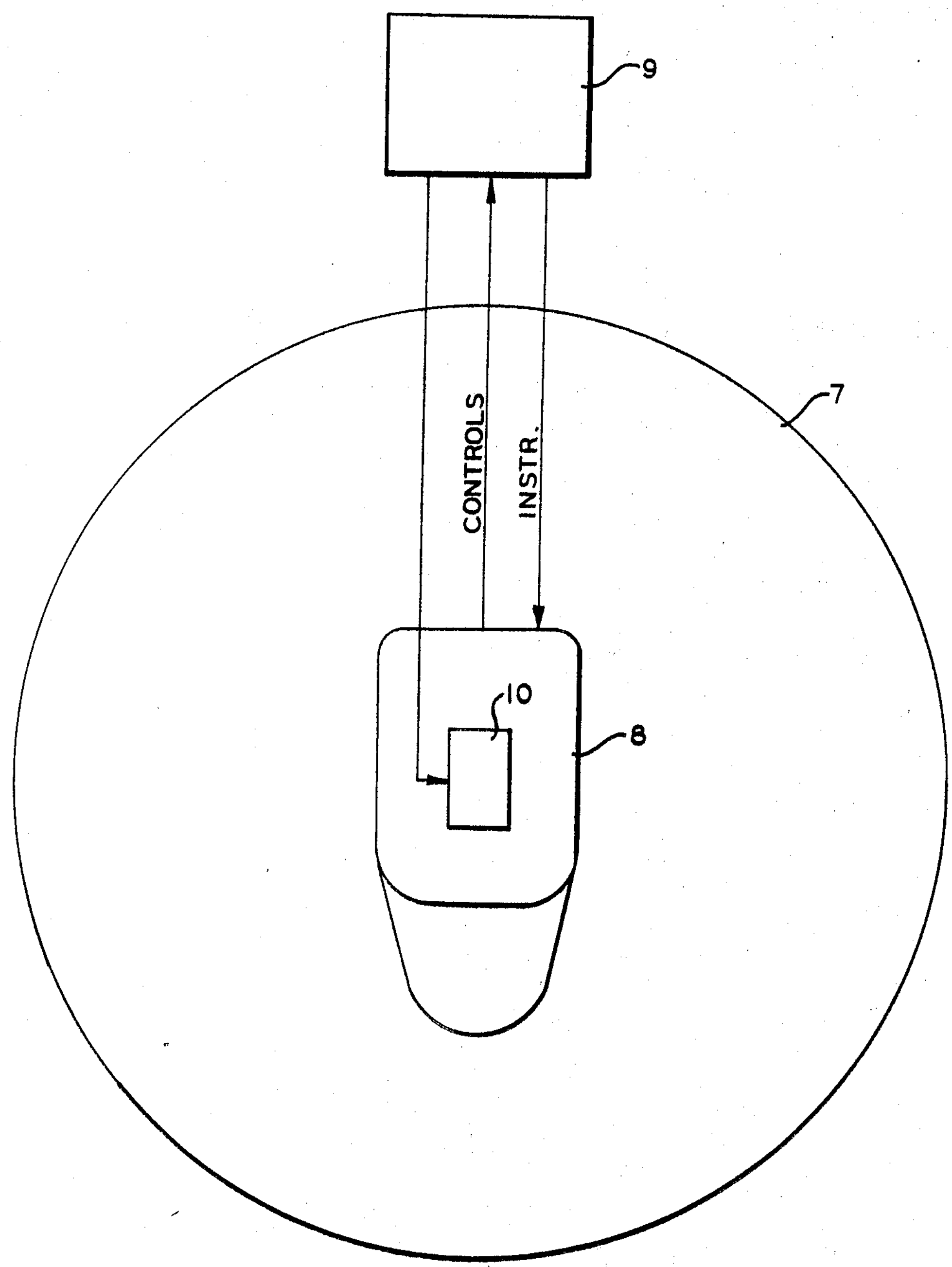
FIG. 1 is a block diagram of a flight simulator system with the projector of the present invention installed atop the simulator cockpit.

FIG. 1 shows a simulator cockpit 8 containing controls which provide commands to a computer 9 which contains the equations of motion and other equations describing the simulated aircraft performance. Computer 9 computes the aircraft parameters and provides instrument indications to cockpit 8 all in a manner well-known in the art. Surrounding cockpit 8 is a cylindrical or spherical screen 7 on which an image is projected by panoramic projector 10 mounted on top of cockpit 8.

In a manner which will become apparent as this description proceeds, projector 10 exhibits on screen 7 a photographic film or transparency of terrain overflown by an aircraft from which the film was made while following a predetermined flight path. Projection of the film presents on screen 7 for viewing by occupants of simulator cockpit 8 an image of the terrain which corresponds substantially identically to that seen from the photographing aircraft at the precise instant that, and so long as, the simulated position of the simulator coincides with the aircraft attitude and position along said flight path. Should the simulated position deviate from that flight path, perspective transformations of the projected image are effected so that the image is correct for the deviant simulated position. This is accomplished by the unique panoramic projector 10 under the control of computer 9 which supplies the required inputs, such as film speed, in accordance with the equations of motion and stored data related to the flight path and attitude of the photographing aircraft. For a more detailed explanation of the general principles involved, reference may be had to the aforementioned U.S. Pat. No. 2,999,322 to Hemstreet.

Translational displacement of the apparent viewpoint along the flight path (i.e., in range) is effected by forward/reverse advancement of the film and/or changes in magnification; lateral and altitude displacements with respect to the flight path are accomplished by projector 10 as will be described below. Rotational displacement may be provided using conventional image rotation techniques and asynchronous film movement.

As will now be described with reference to FIG. 1*a*, a panoramic image of a portion of the earth's surface may be recorded by scanning a line in a circular path and imaging that line on a cylindrical piece of photographic film. In this FIG. (1*a*), point 11 represents a lens located on the longitudinal axis 20 of a cylinder 17. A plane 13 through axis 20 intersects the ground plane 15 and cylinder 17. Points 19 lying on the intersection of plane 13 with ground plane 15 will be imaged on a line 21 formed by the intersection of plane 13 with cylinder 17. If plane 13 is rotated through 360° about cylindrical axis 20 and cylinder 17 is photographic film, then a panoramic image of ground plane 15 is recorded. This image may then be projected on a cylindrical screen to display the recorded image. To an observer located substantially at the point of projection, the projected image appears as if viewed from point 11, the location of the taking lens, which may also be considered a perspective point.

Figure 1A:
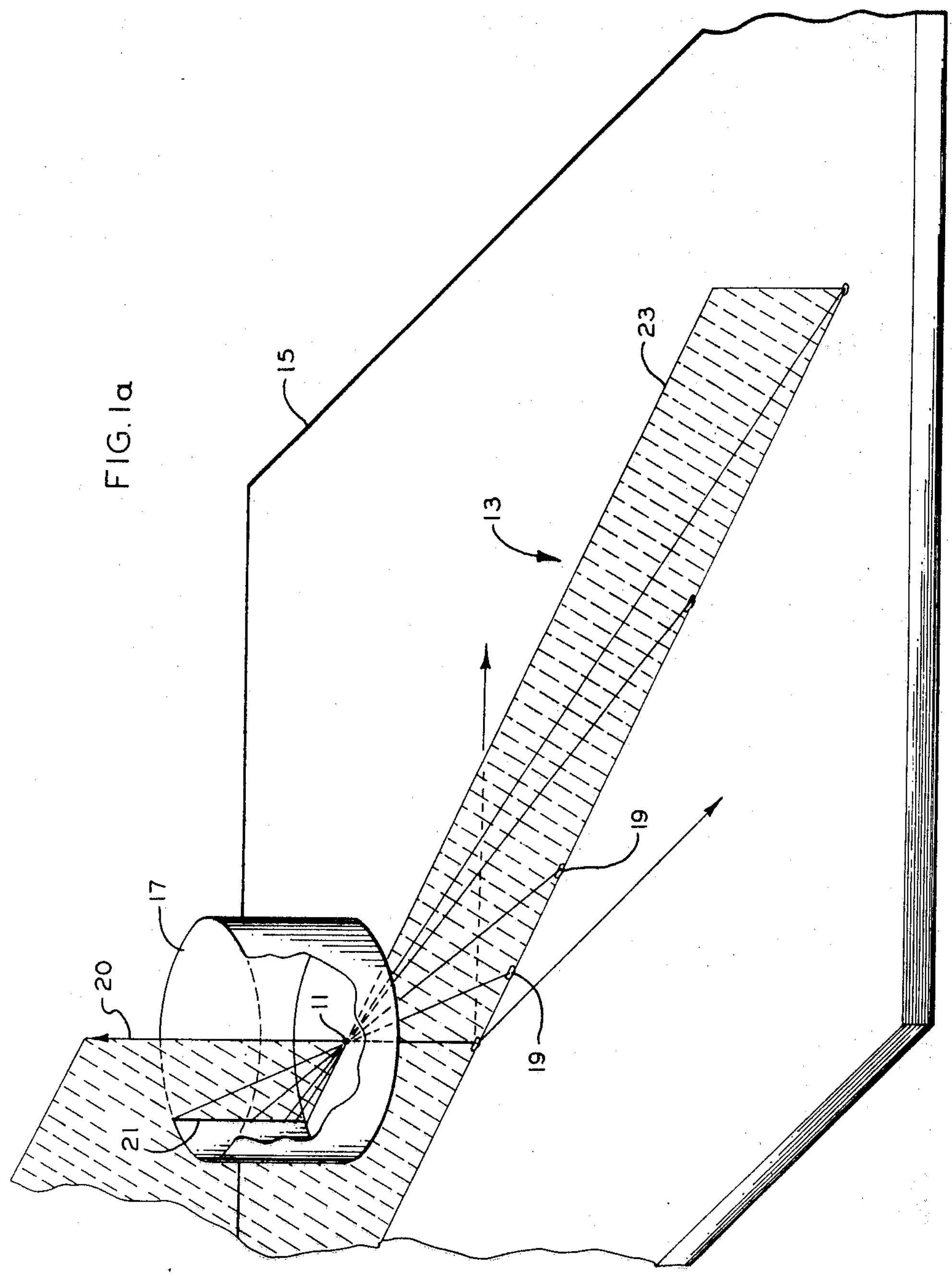

In FIG. 1*a*, line 23 represents the horizon. The scene above the horizon, i.e., portions of sky, can be recorded on a lower portion of cylinder 17, not shown. For a further description of a panoramic camera adaptable for making film in this way reference may be had to U.S. Pat. No. 3,191,182.

If it is desired to project a picture which will appear to an observer as if viewed from a different perspective point (i.e., different from the viewpoint of the taking lens) using the same recorded information various transformations must be made. For ease of reference, the viewpoint from which the film image is recorded may hereafter sometimes be called the "film" or "recording" viewpoint and the apparent perspective point which it is desired to simulate may be called the "simulated" or "display" viewpoint. The cylinders associated with the respective viewpoints, which are utilized for purposes of explanation, may be correspondingly designated.

The display viewpoint may be displaced from the film viewpoint along three orthogonal axes: (1) laterally, (2) vertically (i.e., in altitude) and (3) forwardly and rearwardly (i.e., in range). As previously mentioned, a change in range can be simulated by forward/reverse advancement of the film and/or a change in magnification; while this is not a primary concern of the present invention, it may, of course, be utilized therein and in flight simulator applications normally would be used. This description will address itself initially to the accomplishment of lateral displacement of viewpoint; displacement in altitude will be described in due course.

Figure 2:
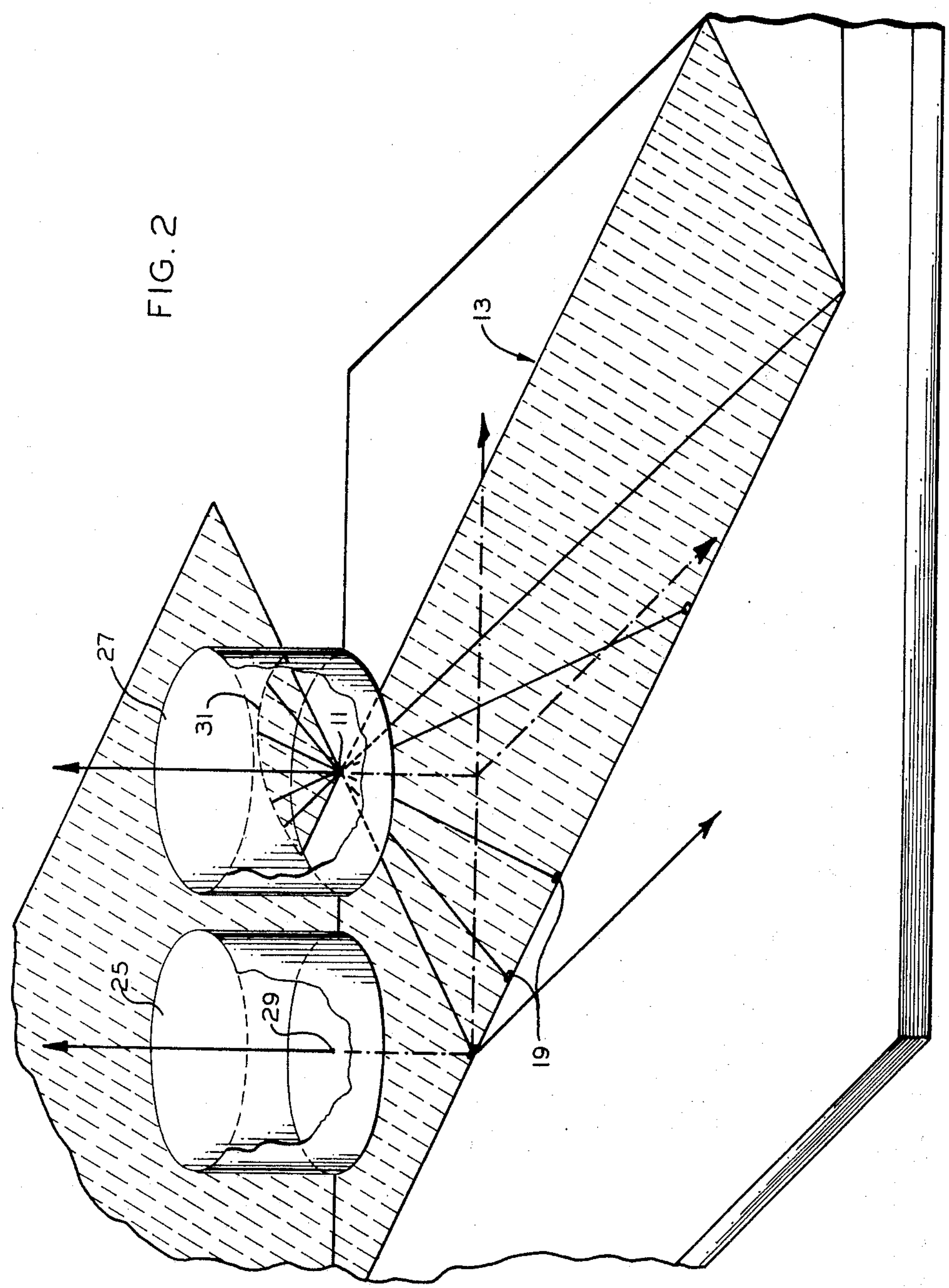

In FIG. 2, two cylinders 25 and 27 are shown. Cylinder 27 represents the recording cylinder (on which the image was recorded from a perspective point 11) and cylinder 25 represents the display cylinder, centered at a laterally-displaced, desired perspective point 29. The points 19 which should appear on cylinder 25 in the same manner as they appear on cylinder 17 of FIG. 1 are recorded on cylinder 27 along a line 31 formed by the intersection of plane 13 with cylinder 27.

The first step in providing the required display is to pick up the desired information from line 31. As projection is accomplished by scanning a line across the cylinder, that line must be optically tilted (i.e., skewed with respect to the axis of the cylinder) to intersect the film along line 31 and then optically straightened and correctly distorted to be projected as if coming from line 21 of FIG. 1*a*.

Figure 3:
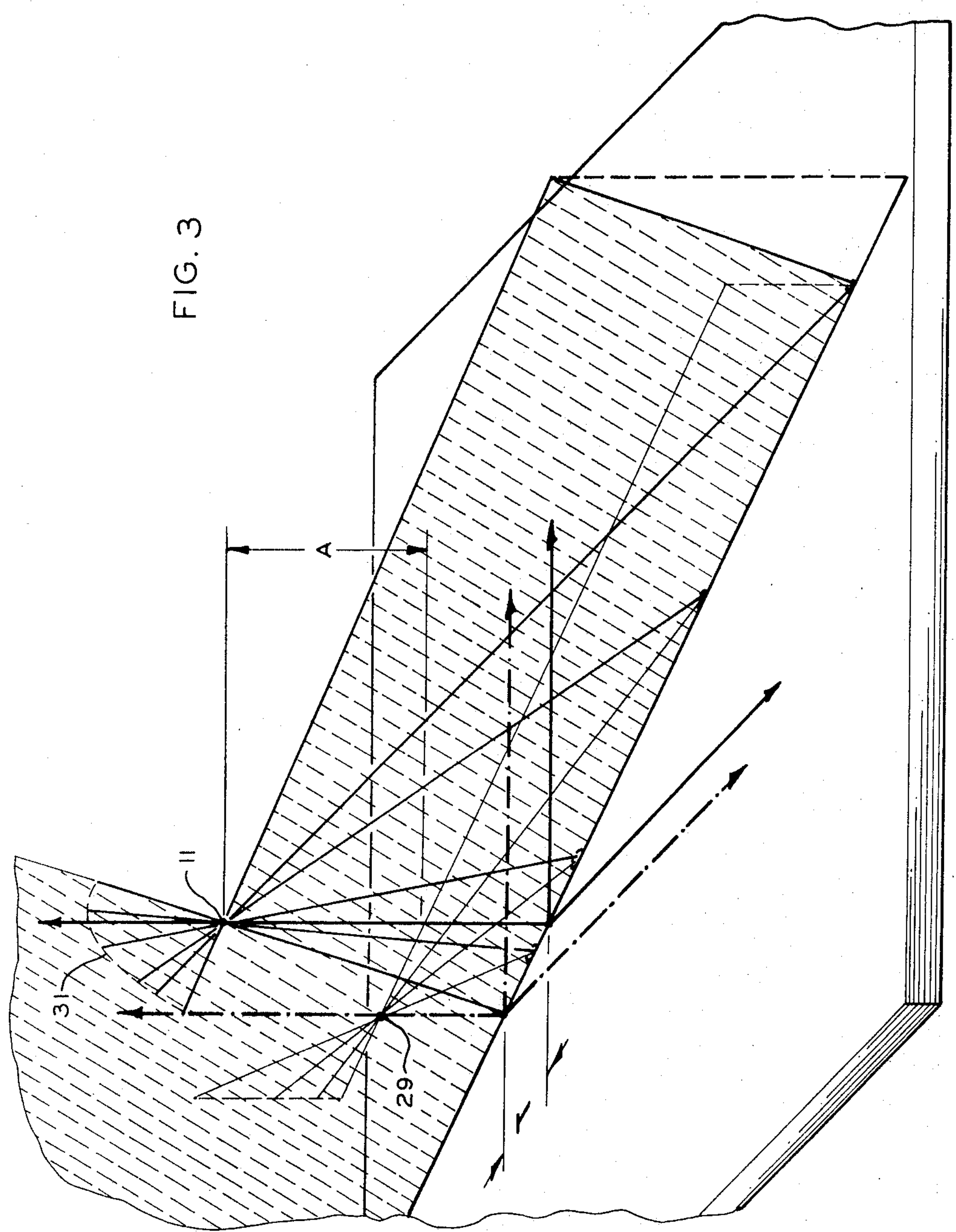
Figure 4:
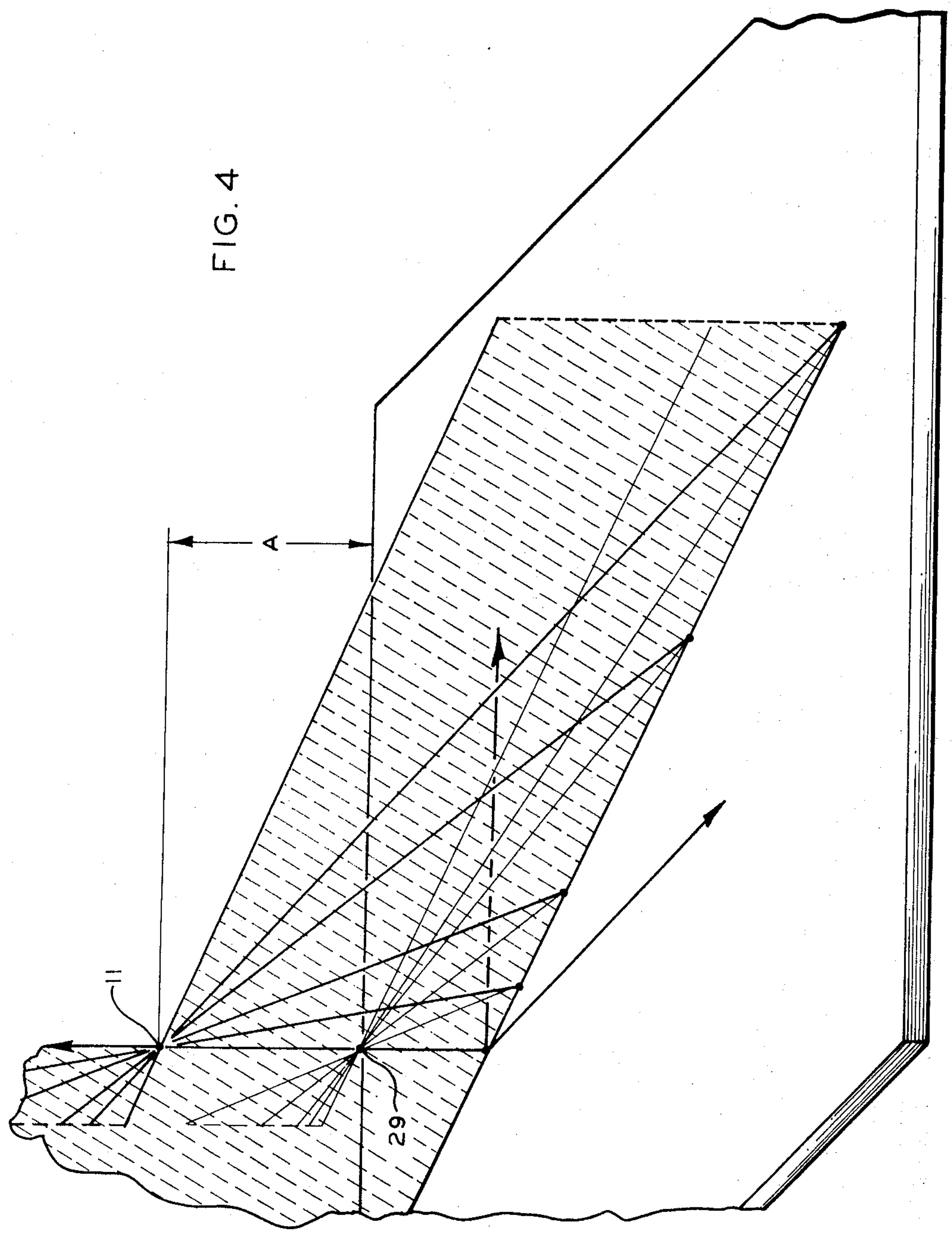

The result of straightening the line is shown in FIG. 3. The image of line 31 is now in the proper plane but actual perspective point 11 is displaced from the desired perspective point 29 by an altitude increment A and a range displacement T. It is well-known that a displacement such as T may be corrected by Scheimpflug distortion. The results of such distortion are shown in FIG. 4; perspective point 11 now lies right above desired point 29. The final transformation may be accomplished using anamorphic distortion, also well-known, to bring the two points into coincidence at point 29.

Figure 5:
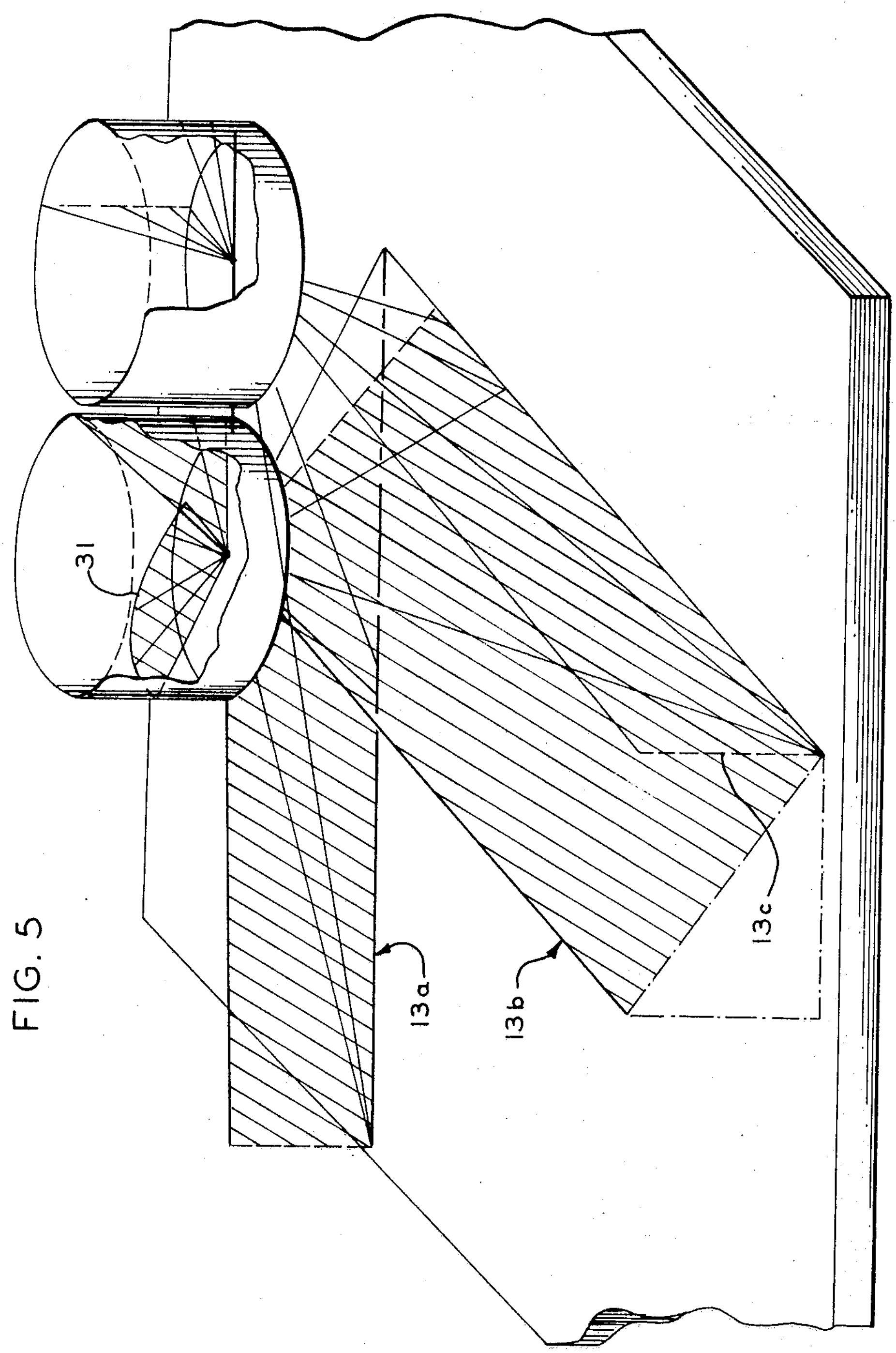

The foregoing explanation treats a series of ground points defining a single line; the line may be considered as a single element of a complete panoramic view which can be generated by rotating plane 13 about axis 20. For any given displacement of the simulated viewpoint from the film viewpoint, the amount and type of correction varies sinusoidally with the instantaneous angular position of plane 13, i.e., the scan angle, as will now be described with reference to FIG. 5. [The datum or plane of reference for the scan angle is a plane normal to a plane defined by the axes of the film viewpoint cylinder and the simulated viewpoint cylinder. Where aerial views are being photographed for use in flight simulator visual systems, this datum would correspond to the forward view along the flight path of the filming aircraft.]

When plane 13 lies in the direction of lateral displacement of the display viewpoint from the film viewpoint, as shown by plane 13*a*, no tilting is required as both cylinders are intersected by a vertical line. The only correction that must be made at this point of the scan is the Scheimpflug distortion. When plane 13 is perpendicular to the direction of lateral displacement as shown by plane 13*c* then, after tilting and straightening, only an anamorphic distortion is required. In between these two extremes a combination is needed.

Figure 6:
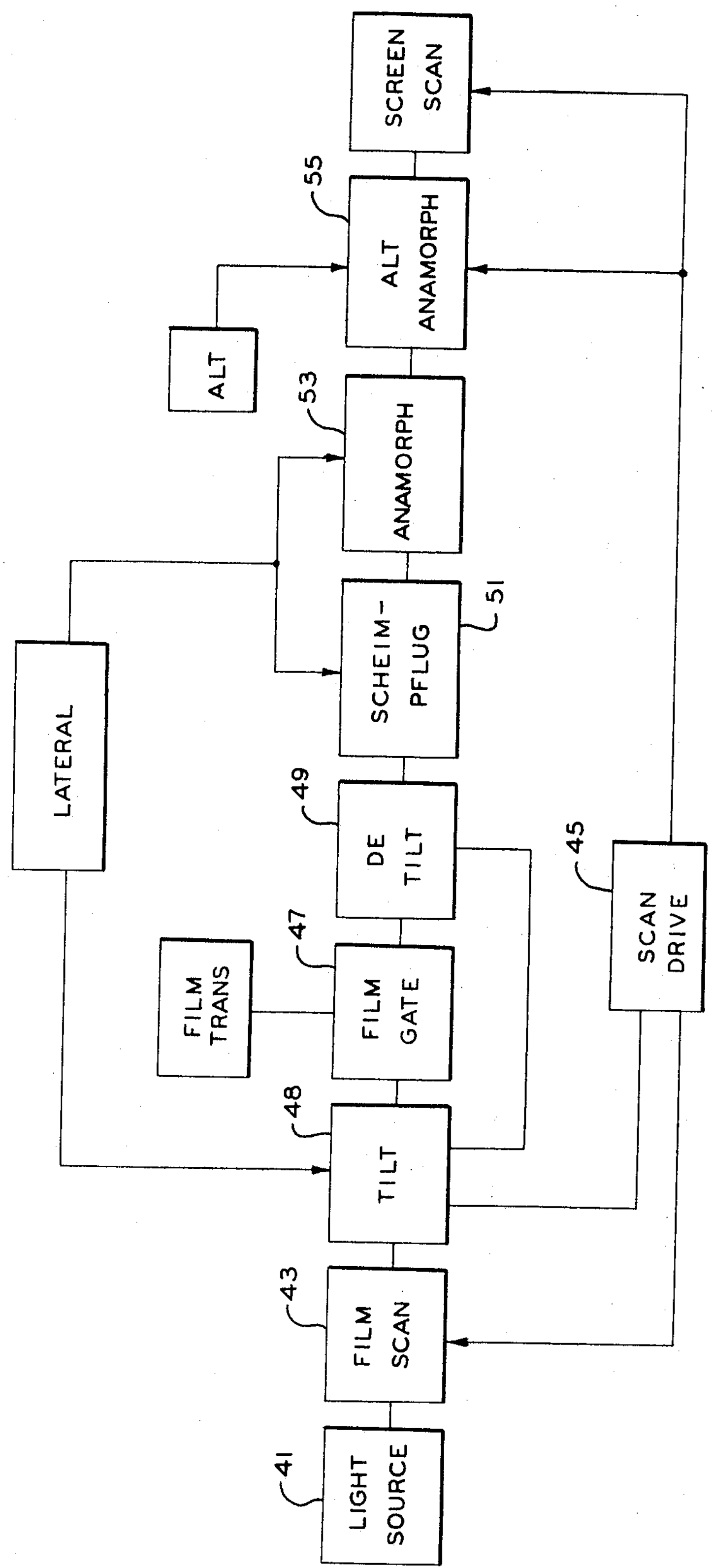
FIG. 6 is a basic block diagram of the panoramic projector of the present invention.

FIG. 6 shows an overall block diagram of the film projection system used to make these transformations. A light source 41 is arranged to project a slit or sheet of light. This light is caused to scan in a cylindrical fashion by scanning mechanism 43 driven by a scan drive 45. Prior to intersecting film gate 47 which is in the form of a cylinder, the slit of light is tilted by block 48 in accordance with the extent and direction of lateral displacement of the display viewpoint from the film viewpoint as well as the scan position, i.e., as previously mentioned, tilt will be zero when the scan is in the plane of lateral displacement of the viewpoints and at maximum when perpendicular thereto and thus sinusoidally varies with scan position. The maximum amount of tilt will depend on the amount of lateral displacement. After passing through film gate 47 and picking up or being modulated by the proper image information the slit of light is returned to the normal, untilted position by block 49. The modulated slit of light is then passed through block 51 where Scheimpflug distortion, as a function of lateral displacement, is applied and then through an anamorphic corrector 53 to make the final correction.

Heretofore, only lateral displacement has been discussed but, as previously mentioned, the simulated viewpoint may also vary in altitude from the film viewpoint. This may be corrected by additional anamorphic transformation indicated by block 55. The slit of light modulated by the image information is finally is provided to an output scanner which will cause the slit to scan in a circular path for projection on a coaxially disposed cylindrical screen.

Figure 7:
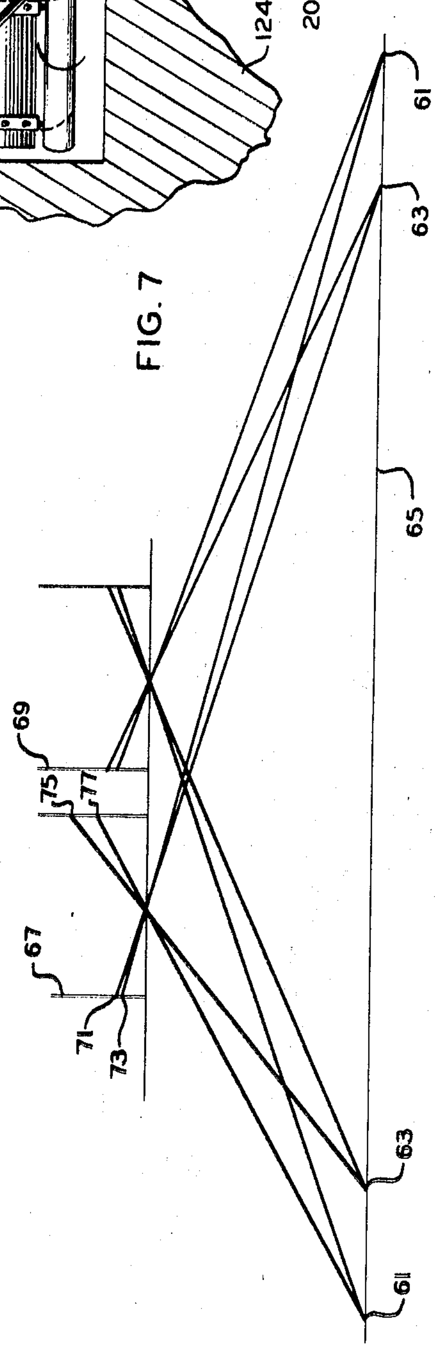
Figure 8:
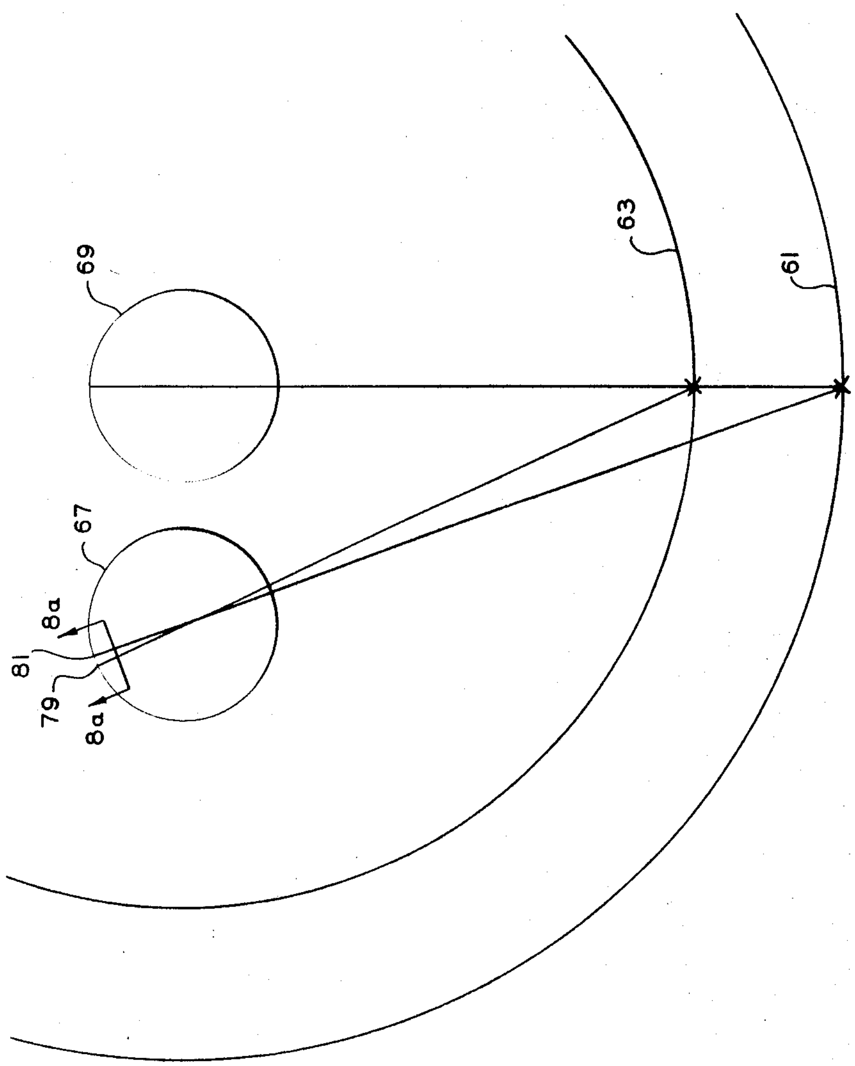

A better understanding of the required transformation is possible from FIGS. 7, 8 and 9. FIG. 7 shows how points, in the plane of translation on two circles 61 and 63 in a ground plane, image on two cylinders 67 and 69. Cylinder 69 represents the desired image and cylinder 67 the image recorded on the film. Points 71 and 73 on cylinder 67 are lower than the desired position on cylinder 69 and too close together; points 75 and 77 are higher and spread too far apart.

Figure 8A:
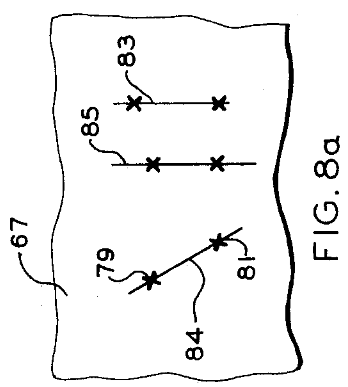
FIG. 8*a* is a sectional view taken on line 8*a*—8*a* of FIG. 8 showing the skewing of the points.

FIG. 8 shows a top view of the circles 61 and 63 and cylinders 67 and 69. Two points on the circles 61 and 63 directly in front of cylinder 69 map as points 79 and 81 on cylinder 67. FIG. 8*a* shows a fragmentary sectional view of this portion of cylinder 67 wherein it is evident that the points lie on a diagonal 84. When the scanning line is tilted as previously described to pick up these points and then straightened, the points will appear as on line 83; however, they should appear as on line 85, that is, they are spaced too far apart. Points (not shown) on circles 61 and 63 to the rear of cylinder 69 (i.e., diametrically opposite points 61 and 63) will map in the same manner.

Figure 9A:
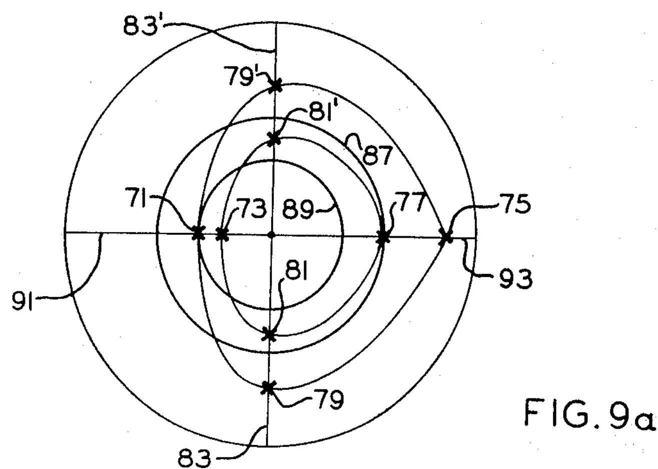
FIG. 9*a* is a mapping of the points of FIGS. 7 and 8 after transformation from cylindrical to radial projection.

If, as the cylinder is scanned, all the lines are brought out through an optical system to a plane which has the horizon point on the optical axis of the system and foreground at the edges of the field, the result is as shown in FIG. 9*a*. Lines 83, 83' represent radial scan lines in a plane perpendicular to the line of lateral viewpoint displacement, which plane would represent the flight path of an aircraft taking film for use in a flight simulator. The points 81, 81' and 79, 79' are magnified from the positions on circles 87 and 89 where they should be if the simulator were on the flight path of the filming aircraft. Line 91 and 93 represent the radial scans to the right and left within the plane of displacement; on these lines, points 71 and 73 are compressed and 75 and 77 expanded as they were in FIG. 7.

Figure 9B:
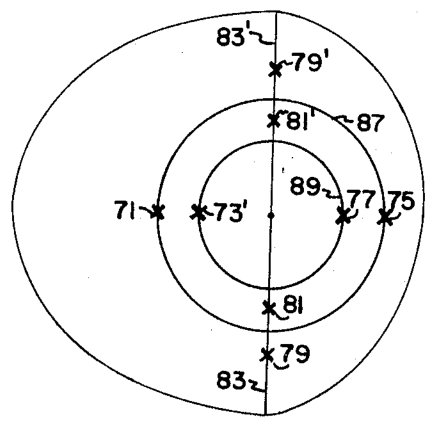
FIG. 9*b* shows the result of a Scheimpflug transformation performed on FIG. 9*a;*
Figure 9C:
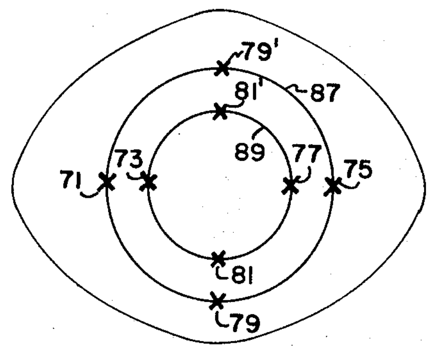

If a Scheimpflug distortion is applied to this image, the result is as shown in FIG. 9*b*. The points 71 and 73 are expanded and 75 and 77 compressed to bring them onto circles 87 and 89. Points 79, 79' and 81, 81' are not affected. Then if the image of FIG. 9*b* is anamorphically demagnified along the axis of lines 83, 83' points 79, 79' and 81, 81' will be brought onto circles 87 and 89, as shown in FIG. 9*c*, to obtain the desired image which may then be projected onto a screen. Although a number of scan lines are shown it should be kept in mind that at one instantaneous time period only one line will be present. At the stage of operation of the system shown in FIG. 9*a*, this scan will rotate like the scan on a radar PPI scope. A line such as line 83 will pass through the center or optical axis with the horizon at that point, and where an upper part is shown, a portion of sky may be present.

Figure 10A:
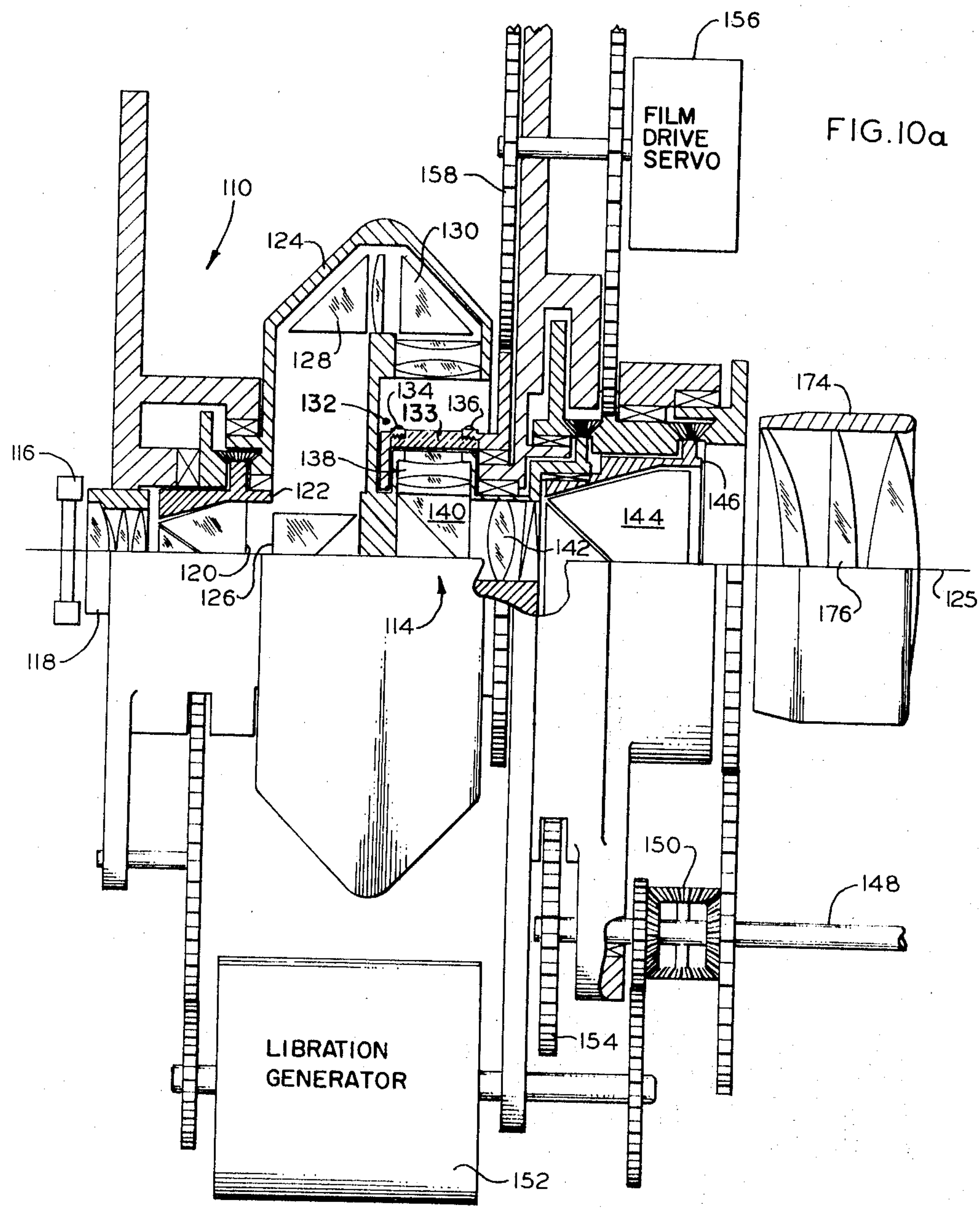
FIGS. 10*a* and 10*b* jointly constitute an elevational view, partially in cross section, of a projector embodying the present invention.

FIGS. 10*a* and 10*b* jointly show in detail a first embodiment of a panoramic projector which utilizes the principles described above. Referring first to FIG. 10*a*, an illumination assembly 10 includes a light source 116 which emits a thin, elongated slit of light through a condenser lens assembly 118. A Pechan prism 120 is mounted in a cylindrical housing 122 with its optical axis coincident with the longitudinal axis of the housing. Housing 122, in turn, is mounted for rotation about its longitudinal axis which coincides with the optical axis 125 of the projector.

An illumination drum 124 is mounted for rotation about optical axis 125 and includes a prism 126 which reflects the slit of light from the Pechan prism 120 into a radial path. The radially projected slit of light is transferred by means of a prism 128 and a prism 130, each mounted within the illumination drum 124, toward a film transport drum 132. The slit of light impinging on film transport drum 132, hereafter sometimes referred to as the film gate drum, is directed radially toward the optical axis 125 of the projector. Drum 132 is cylindrically-shaped and includes spaced rows of sprocket teeth 134 and 136 (best shown in FIG. 11) thereon which engage corresponding sprocket holes in a film strip. Drum 132 is formed with a cylindrical glass portion 133 mounted between the rows of sprocket teeth 134 and 136 through which the slit of light is passed after picking up the image from the film. A lens assembly 138 transmits the slit of light passing through the film to a prism 140. Both lens assembly 138 and prism 140 are fixedly mounted to, and rotate with, illumination drum 124. A lens and prism assembly 142 transmits the slit of light reflected from prism 140 to a Pechan prism 144 which is mounted, with its optical axis coincident with axis 125, within a housing 146 which is, in turn, mounted for rotation along with prism 144 about optical axis 125.

A projector servo 147 (appearing in FIG. 10*b*) has a drive shaft 148 connected to one input of a differential 150 having an output differentially coupled to housing 146 which supports Pechan prism 144. Another input to differential 150 is provided from a libration generator 152. Projector servo drive shaft 148 is also differentially coupled to illumination drum 124 by means of a gear 154. Illumination drum 124 is differentially coupled to housing 122 which supports Pechan prism 120. Libration generator 152 is also differentially coupled to housing 122. A film drive servo 156 is differentially coupled to illumination drum 124 and Pechan prism 144 (through housing 146) and is directly connected by means of a gear 158 to film drum 132.

The various gear ratios are established to provide Pechan prism 120 with an angular velocity $\omega_5$ in accordance with the expression:

$$\omega_5 = \omega_1/8 + \omega_2/2 + \omega_3/4 \qquad 1.$$

wherein, $\omega_5$ denotes the angular velocity of Pechan prism 120,

$\omega_1$ denotes the angular velocity at the output of projector servo 147,

$\omega_2$ denotes the angular velocity at the output of film servo 156, and $\omega_3$ denotes the angular velocity at the output of libration generator 152.

In addition, illumination drum 124 is provided with an angular velocity $\omega_6$ in accordance with the expression:

$$\omega_6 = \omega_1/4 + \omega_2 \qquad 2.$$

Pechan prism 144 is driven at an angular velocity $\omega_7$ in accordance with the expression:

$$\omega_7 = \omega_1/4 - \omega_2 - \omega_3/4 \qquad 3.$$

Assuming a case where the film is stationary and the simulated perspective is coincident with the point from which the image was recorded, the following would take place: Film gate drum 132 would then be stationary and illumination drum 124 would rotate about the film. As no tilting is required (because the perspective points are coincident), the light slit must constantly intersect the film in a line parallel to optical axis 125. Thus the orientation of the slit input to prism 126 must be optically aligned with, and immobile relative to, this prism. Consequently, as prism 126 rotates along with drum 124, the slit from illumination source 116 must also rotate. The rotation of the slit is the function of Pechan prism 120. However, as is characteristic of Pechan prisms, the output of prism 120 will be rotated twice the angular rate of the prism. In this example, therefore, it would be required that prism 120 rotate one-half the rate of drum 124. This is confirmed by equations (1) and (2) as follows:

Per equation (1), the angular velocity, $\omega_5$, of prism 120 =

$\omega_1/8 + \omega_2/2 + \omega_3/4$

Per equation (2), the angular velocity, $\omega_6$, of drum 124 =

$\omega_1/4 + \omega_2$

In the assumed example (no film motion, no viewpoint displacement), $\omega_2$ and $\omega_3 = 0$ Therefore, $\omega_5 = \omega_1/8$ and $\omega_6 = \omega_1/4$ or $2\omega_5$ Prism 144 at the output of illumination drum 124 is rotated at a speed equal to that of drum 124 and thus the image will not be changed as it passes through prism 144, i.e., $\omega_7 = \omega_1/4 = \omega_6$.

If the film is moved but no skewing is required a component must be added to each rotation to account for film motion. Assuming one is looking at a fixed slit which must intersect the film at a predetermined point: as the film moves, the slit must move with it; thus drum 124 must move at a rate of $\omega_2$ and prism 120 at $\omega_2/2$.

Figure 10:
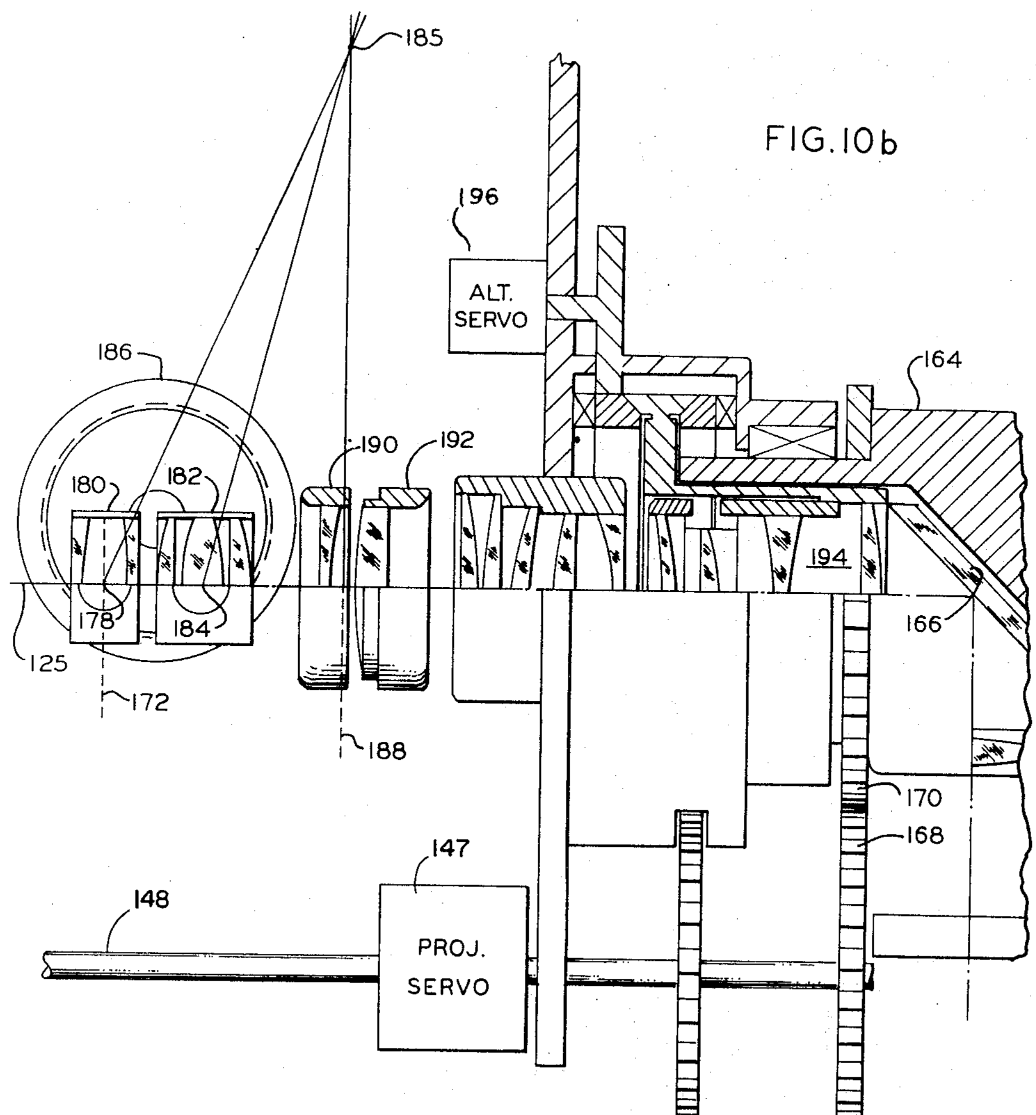
Figure 10:
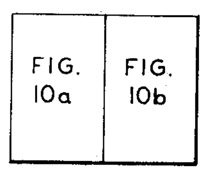

With the film moving, a slit which represents the view forward, e.g., looking forwardly along the flight path, and which was formerly in the plane of the paper in FIG. 10, perpendicular to and above axis 125, at the output of prism 144, may now be rotated 90°, for example, and be perpendicular to the plane of the drawing. To correct for this condition, prism 144 is rotated $\omega_2/2$ to cause a derotation of the image equal to $\omega_2$.

The final component in the equation, $\omega_3$, is the input from libration generator 152. This input provides the required tilt based on lateral displacement. It must be driven according to the equation:

$\omega_3 = k \cos \omega_1 t$, with $t_0$ (or zero scan angle) occurring with the slit in a plane perpendicular to the line of lateral displacement (or looking forwardly along the actual flight path) and $k = \arctan d/h$ where $h$ is the altitude of the film viewpoint and $d$ the distance of displacement of the simulated viewpoint from the film viewpoint.

If the optical elements of the projector illustrated in FIG. 10 are stationary and in the position illustrated in the drawing, a slit of light emitted from light source 116 in the plane of the drawing is inverted by Pechan prism 120 (but remains in the plane of the drawing) and is reflected by prisms 126, 128 and 130 to impinge upon the film in parallel relationship to optical axis 125 of the projector. The light slit passing through the film is modified in accordance with the pictorial information on the film; is reflected by the prism 140; and is inverted by Pechan prism 144 to produce a line image perpendicular to optical axis 125 and in the plane of the drawing. If the illumination drum 124 is maintained stationary and Pechan prism 120 is rotationally displaced by a small amount, the slit of light emitted therefrom will be rotated out of the plane of the drawing.

This same rotational displacement of the slit of light is maintained through prisms 126, 128 and 130. Consequently, the light impinges on film gate drum 132 in skewed relationship with respect to the optical axis, in the manner of scan line 31 illustrated in FIG. 2. The scan line, which now contains optical information from the film, emitted from prism 140 is again angularly displaced out of the plane of the drawing. If Pechan prism 144 is provided with an angular displacement opposite to the displacement of Pechan prism 120, the angularly displaced scan line is rotated back into the plane of the drawing and perpendicular to optical axis 125.

The $\omega_3/4$ terms in equations (1) and (3) provide this skewing. In the implementation of equation (1) the slit is skewed and in equation (3) returned to parallelism with respect to axis 125, resulting in the type of line shown by lines 93 and 91 of FIG. 9*a*. As previously mentioned optical transformation must be effected with the horizon at the center; accordingly, the horizon must be on optical axis 125 of the projector as the slit images pass through prism 144. To accomplish this, prism 140 in drum 124 is positioned so that the horizon will fall on optical axis 125. The resulting image at the output of prism 144 will be a rotating slit image of elements of pictorial information stored on the film.

If the film is to be motion picture film, means, described presently, are provided to transport film to and from film gate drum 132. However, the area where film enters and exits from the gate leaves a gap so that, normally, a certain portion of a full 360° image cannot be projected. To avoid this problem the image of 360° of pictorial information is compressed into 180° as viewed at film gate 132. Thus at any given time portions of two or more film frames, each having 360° of image information stored thereon, will be in the film gate; accordingly, 180° of scan by drum 124 must appear as 360° of slit rotation at the output of prism 144. This requires adding more rotation to prism 144.

If equation (3) is changed to:

$\omega_7 = 3\omega_1/8 - \omega_2 - \omega_3/4$ the proper output is obtained. The $\omega_1$ term was formerly $\omega_1/4$ or $2\omega_1/8$. This velocity caused it to track the scan input with no output change. The additional component of $\frac{1}{8}\omega_1$ causes an output which is doubled or $2/8\omega_1$. Thus the final output is $\frac{1}{2}\omega_1$ or twice the input rate; consequently, as the input rotates through 180°, the output will rotate through 360°.

The optical information leaving Pechan prism 144 is transmitted through a plurality of lens assemblies to a projector scanner 164 which includes a mirror 166 mounted at a 45° angle to optical axis 125. Scanner 164 is rotationally driven about the optical axis by means of projector servo shaft 148 through a pair of gears 168 and 170. Scanner 164 is driven at one-half the angular velocity of the projector servo, or $\omega_1/2$ (assuming two frames of film at gate 132). The optical information in polar format emitted from Pechan prism 144 is converted to rectangular format by means of rotating mirror 166. If a cylindrical screen, concentric with optical axis 125, encloses rotating mirror 166, the resulting display will be a panoramic image of the scene recorded on the film.

If no image transformation were required the elements between prism 144 and scanner 164 would not be necessary. The information on the film would be reconstructed on the screen without change. However, the optical elements between prism 144 and mirror 166 are provided to perform the transformations described above in connection with FIGS. 7, 8 and 9.

Light leaving Pechan prism 144 is collimated and is then converged or focused to an intermediate image plane 172 by means of a lens assembly 174. Lens assembly 174 is rotatable, as by means of a conventional position servo, not shown, about an axis 176 perpendicular to optical axis 125 and appearing as a point (176) in FIG. 10*a*. Because the light impinging on lens assembly 174 is collimated, any rotation of the lens assembly will cause a rotation of the intermediate image plane about an axis 178 (appearing as a point in FIG. 10*b*) which is perpendicular to axis 125 at its intersection with intermediate image plane 172. A lens assembly 180 is mounted at the intermediate image plane 172 for pivotable movement about axis 178.

Another lens assembly 182 is mounted for pivotable movement about an axis 184 parallel to axis 178 and appearing as a point in FIG. 10*b*. The frames which hold lens assemblies 180 and 182 are provided with gears of different dimensions which are engaged by a ring gear 186 driven by a conventional position servo, not shown, to effect rotation of lens assemblies 180, 182 about axes 178, 184. Lens assembly 182 forms a second intermediate image at a plane 188 which remains perpendicular to the optical axis by virtue of the rotation of lens assemblies 180 and 182. The dimension of the gears on lens assemblies 180 and 182 and engagable by ring gear 186 are such as to maintain a common line of intersection, appearing as a point (185) in FIG. 10*b*, between the principal plane of lens assembly 180, the principal plane of lens assembly 182, and the plane 188 of the second intermediate image.

This system of lenses provides the Scheimpflug correction described in connection with FIG. 9*b*. The degree of rotation lens assemblies 174, 180 and 182 about their respective axes 176, 178, 184 is a function of lateral displacement as described above in connection with the operation of libration generator 152 in implementing the term $\omega_3$ in equation (1). Thus there is a direct relationship between the input to libration generator 152 and the input to the Scheimpflug lens system. The greater the lateral displacement the greater the maximum tilt provided by libration generator 152 and the greater the Scheimpflug correction required. An anamorphic zoom lens system, consisting of an anamorphic lens 190 and an anamorphic lens 192 in tandem and axially movable with respect to one another, provide magnification of the image along one axis as described above in connection with FIG. 9*c*.

The magnification of the anamorphic lens system also is a function of lateral displacement since the more tilt required, the wider the spacing between points 81 and 79, as can be seen from FIGS. 8 and 9. As in the case of the Scheimpflug lens system, the anamorphic lens system will be driven by conventional servo systems in response to computer commands.

The final element in the optical path prior to mirror 166 is an anamorphic zoom lens 194 used to simulate altitude change. This anamorphic lens operates on the same principle as the one described in connection with FIG. 9*c*, i.e., magnification or demagnification takes place on one axis only. Altitude change may be simulated by compressing or expanding the line image; however, unlike the magnification required for correction, which was only required along one axis, in an altitude change, all portions of te image must be affected. Thus lens 194 is connected to projector servo shaft 148 and is caused to rotate so that the scanning slit is aligned to its magnification axis and, consequently, the image is equally magnified over the full 360°. The input to change magnification in accordance with the ratio of the simulated perspective point altitude to film viewpoint altitude is provided by an altitude servo 196.

Figure 11:
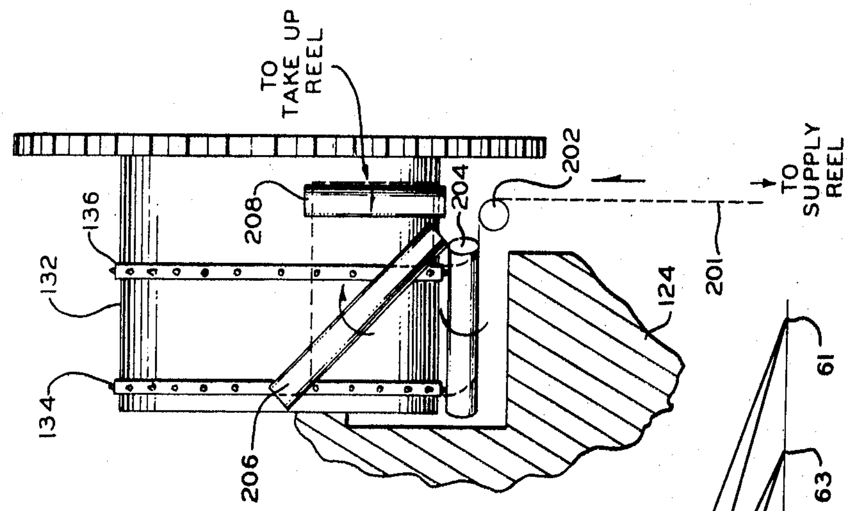
FIG. 11 illustrates the film supply and take-up means for the embodiment of FIGS. 10*a*, 10*b;*

FIG. 11 shows a means of supplying film to the gate 132. Film 201 is provided by a supply reel (not shown) to a vertical roller 202 which changes its direction of motion by 90°. From roller 202, the film is fed to a roller 204 having its axis parallel to the plane of, and rotated 45° with respect to, the axis of roller 202, and thence to film gate 132. Film 201 is removed from the gate in a similar manner over 45° roller 206 and thence over a horizontal roller 208 to the take-up reel (not shown).

The camera for exposing the panoramic film is basically the same as the projector of FIG. 10 without the distortion optics, the illumination drum, the illumination source and libration drive.

In a camera application, mirror 166 rotates continuously and picks up the image, reflects it through prism 144 to prism 140 which images it on unexposed film contained in the film gate 132. Prism 140 rotates at one-half the speed of mirror 166 so that two images are recorded on a 360° segment of film. Prism 144 compensates for the additional rotation required to accommodate film motion in the same manner as in the projector. New frames need only be exposed at a rate reflecting noticeable change in the image viewed.

Figure 12:
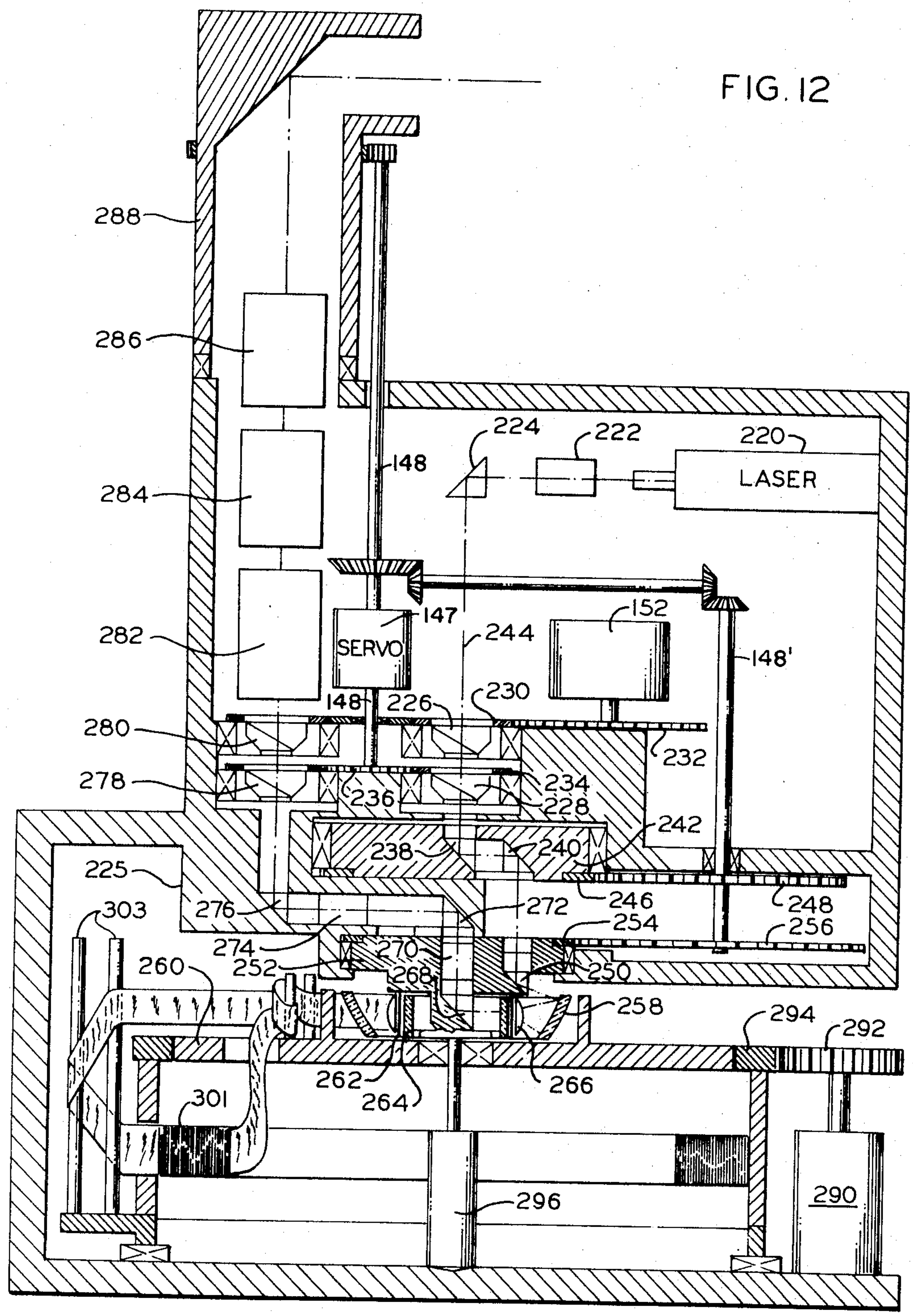
FIG. 12 is a cross sectional view of a projector constituting a second embodiment of the present invention.

FIG. 12 is a cross-sectional view of a second embodiment of the invention which eliminates most of the differential gearing and has a unique film drive hereinafter described in connection with FIG. 13, below. The elimination of differential gearing is accomplished by the addition of more prisms resulting in increased light loss through the system. To achieve the required output brightness, the light source must be a very bright, highly degenerate source. The best source at present available is a white light laser. Such a laser, shown at 220, forms a slit as in the previous embodiment. The slit, or line, is collimated by a lens 222 and reflected at right angles by a prism 224 to provide the projector input. The basic principles upon which the projector operates are as described above in connection with the first embodiment and, where appropriate, common reference numerals are used hereinafter to denote parts common to both embodiments. The elements to provide for line rotation during scanning are contained in a fixed frame 225.

The first optical element encountered by the light from prism 224 is a Pechan prism 226. After passing through prism 226 the light passes through a second Pechan prism 228. Prisms 226 and 228 are mounted for rotation in frame 225 about optical axis 244 by suitable bearing means and perform the function of prism 120 in the embodiment of FIG. 10. Prism 226 has coaxially mounted on it a gear 230 driven by a gear 232 driven by libration generator 152. Prism 228 has coaxially mounted on it a gear 234 driven by a gear 236 mounted on the shaft 148 of projector servo 147. Thus velocities $\omega_1$ and $\omega_3$ described in equation (1) above are imparted to the scanning slit. The film velocity $\omega_2$ is not required since the film remains stationary as described below.

The rotating slit leaves prism 228 and is reflected at right angles by prism 238 and again at right angles to parallel its original path by prism 240. Prisms 238 and 240 are mounted in a member 242 which is itself mounted in suitable bearing means for rotation about the axis 244 within frame 225. Mounted on member 242 is a gear 246 which is driven by a gear 248 connected to an output shaft 148' coupled to projector servo 147. The result produced at the output of prism 240 is a scanning line which is always radial to axis 244, assuming no tilt due to a libration input to prism 226.

The output of prism 240 is provided to a prism 250 mounted in a member 252 which, in turn, is mounted in suitable bearing means for rotation about axis 244. Member 252 has mounted on it a gear 254 which is driven by a gear 256 on the output shaft 148 of projector servo 147; consequently, prisms 250 and 240 remain aligned as they rotate.

Light is reflected by prism 250 to a mirror 258 in the film drive mechanism 260 to be described presently. Film 262 is disposed on a transparent film drum 264. The slit of light will be reflected by mirror 258 and imaged by a field lens 266 onto film 262. As will be more clearly apparent as the description proceeds, both mirror 258 and lens 266 are of an annular configuration. As prism 250 rotates, it projects a moving slit onto film 262 via mirror 258 and lens 266.

After being modulated by the film image, the light slit is reflected by a prism 268 which also is mounted in rotating member 252 and, therefore, also is aligned with prism 250 (and 240). Prism 268 reflects the light back along axis 244 to a lens 270 which relays the image to a stationary prism 272 mounted in the main frame 225. A relay lens 274 transmits the image to another prism 276 which reflects it along an axis parallel to axis 244.

Therefore, two Pechan prisms 278 and 280 are coaxially rotatably mounted in series on frame 225 in the optical path of light exiting from prism 276. In combination prisms 278 and 280 duplicate the function of prism 144 in the first-described embodiment, doubling the rotation rate of the slit image and removing tilt, if present. To this end, prism 278 is driven through suitable gearing from projector servo 147 and prism 280 from libration generator 152. As previously mentioned no film speed input ($\omega_2$) is required in the FIG. 12 embodiment.

The remainder of the optical system is identical to that of FIG. 10 and includes a Scheimpflug lens system 282, an anamorphic correction lens system 284, altitude zoom lens 286 and projection head 288.

Film drive mechanism 260 is mounted for rotation on frame 225 by suitable bearing means and is driven by film drive servo 290 via gears 292 and 294. Film drum 264 is mounted on the shaft of a servo motor 296 fixed to frame 225, the shaft of motor 296 being suitably journaled in bearings where it passes through film drive mechanism 260. Aside from motion caused by motor 296, to be described below, drum 264 remains fixed, with mechanism 260 rotating to move film to and from the drum as will be explained in connection with FIG. 13. Thus, frames of film on drum 264 do not move relative to the drum eliminating the need for a film drive correction to the rotating slit.

Figure 13:
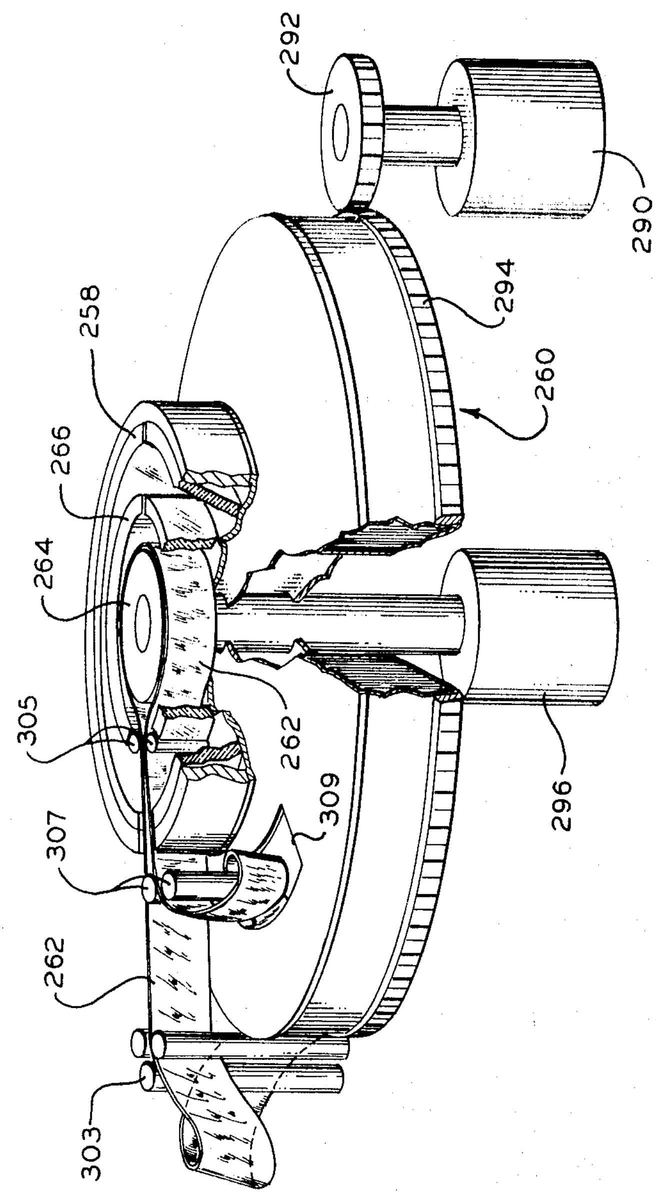
FIG. 13 is a perspective view of the film drive system of the embodiment of FIG. 12.

In FIG. 13 a perspective view of the film drive mechanism 260 is shown. Film is stored in an endless loop (301, FIG. 12) inside mechanism 260. The film is brought out through an opening in the body of mechanism 260 and brought around guide rollers 303 which direct it onto the drum 264. An opening is provided in annular mirror 258 and lens 266 to allow film 262 to pass to and from the drum. A pair of opposed rollers 305 is provided adjacent the opening in annular lens 266. Film from rollers 303 passes over one of the rollers 305, around drum 264, and exits over the other roller 305 to a group of rollers 307 which orient it for rewinding on the inside of the loop 301 through an opening 309 in the case of mechanism 260.

Motor 296 shown in FIGS. 12 and 13 may be used to simulate heading changes. Pitch and roll in both embodiments and heading in the first-described embodiment may be accomplished using any conventional technique such as gimballing the projector head.

When two frames of film are on the drum at one time, it is often necessary to scan one frame only in a repeated fashion, e.g., when the simulated aircraft is stopped. Thus, means must be provided to determine which frame to scan and to turn off illumination at other times.

Figure 14:
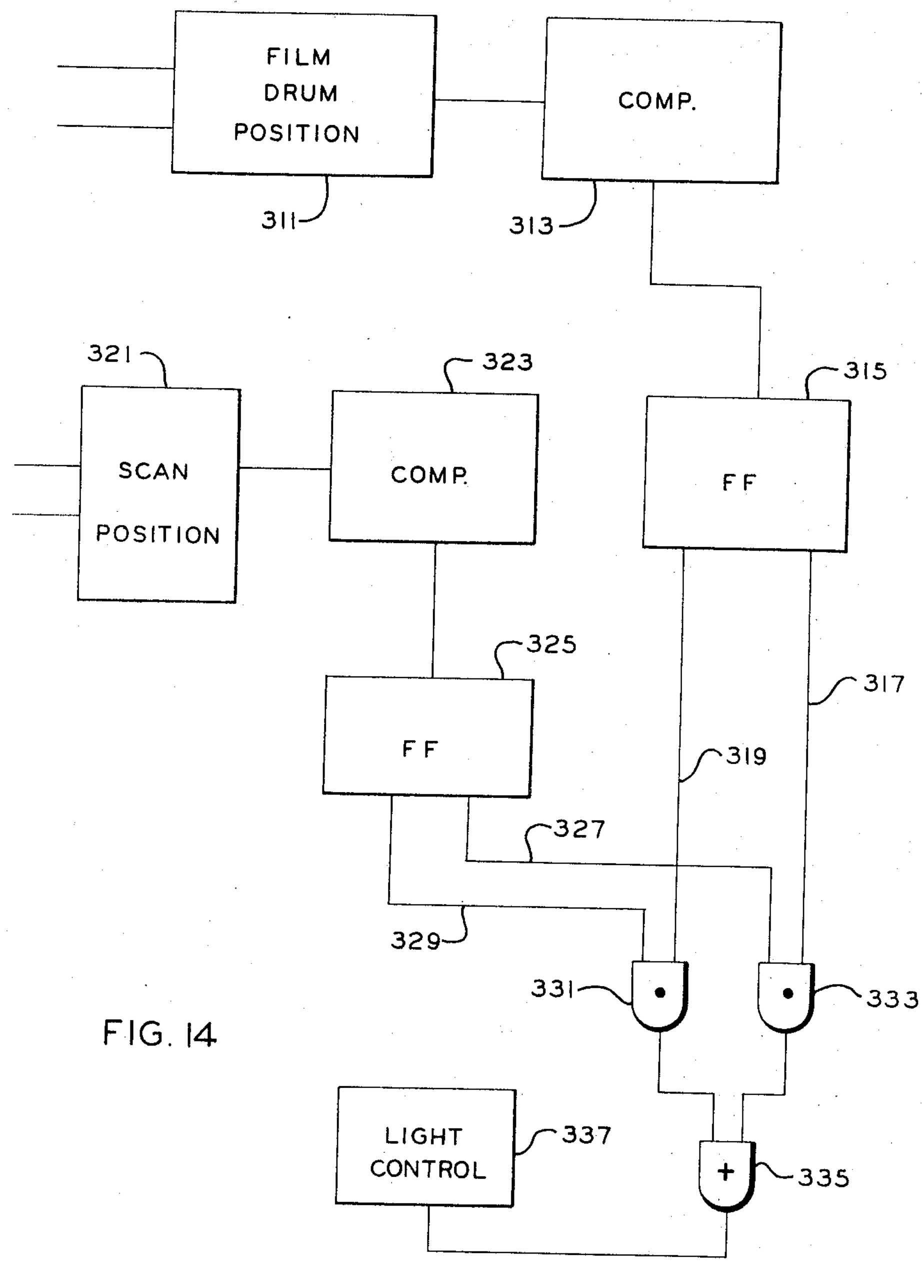
FIG. 14 is a logic block diagram of a projection lamp control system for selective scanning as utilized in the present invention.

A logic diagram of a circuit which performs this task is shown in FIG. 14. With two frames of film on the drum, each time the drum rotates through 180° a frame advance has occurred. Thus, by placing a shaft encoder 311 which resets every 180° on the drum and comparing its output in a digital comparator 313, a signal may be provided each 180°. The same function might also be accomplished with limit switches and cams mounted on the drum. This 180° signal may be used to trigger a flip flop 315. Thus, the two flip flop outputs correspond to the two 180° segments. For example, an output on line 317 would indicate the first segment and one on line 319 the second segment.

The scan also rotates through 360° or two 180° segments. In a similar manner an encoder 321, comparator 323 and flip flop 325 may be used to provide signals on lines 327 and 329 indicative of the first and second segments of scan respectively.

If the first segment film frame signal and first segment scan are then provided as inputs to AND gate 331 there will be an output only when the first segment is in viewing position and is being scanned. Likewise, the second segment frame and scan signals are provided as inputs to AND gate 333 to provide an output only when the second segment is in viewing position and being scanned.

The outputs of gates 331 and 333 then are provided as inputs to OR gate 335 to generate an output to light control 337, for example, a shutter interposed in the input light path.

Although a system useful in flight simulation in which motion pictures recorded on one flight path may be shown as if viewed from a displaced flight path has been emphasized it should be evident that by eliminating various parts of the system, other types of projectors may be obtained. For example, by removing the film drive a panoramic view of a still frame with the capability of perspective transformation may be provided.

A more important application of a portion of the system of the present invention is in the entertainment field. In such an application perspective transformation is not normally required. However, by keeping portions of two frames on film on the film drum as described above a truly panoramic projection (i.e., 360°) is possible. This type of projection also avoids the jitter and short film life problems associated with conventional wide angle projectors now available.

If the embodiment of FIG. 12 were to be adapted for entertainment use, the Scheimpflug and anamorphic optical systems 282, 284 and 286 would be eliminated. The libration generator 152 and its associated gears 230 and 232 and prisms 226 and 280 would also be unnecessary as skewing of the slit would not be required. Motor 296 could be eliminated or in some applications might be retained and rotated to cause the observers viewing a panoramic motion picture to have the sensation of rotating. As previously mentioned, the embodiment of FIGS. 10*a* and 10*b* could be similarly simplified.

A panoramic projection system having applications in the simulation and entertainment fields has been shown. Although two specific embodiments have been shown and other specific modifications described it will be evident to those skilled in the art that various other modifications may be made without departing from the spirit of the invention.

What is claimed is:

1. A method of projecting a panoramic display of an image from an image-bearing transparency onto a curved surface with an apparent first perspective point laterally displaced from a second perspective point from which the image was recorded on the transparency, comprising the steps of:

a. disposing at least a portion of a panoramic image-bearing transparency in a curved configuration with the upright axis of the image on said transparency substantially parallel to the axis of curvature of said transparency while scanning said transparency so disposed with a slit of light having a normal orientation parallel to and rotating about said axis of curvature;

b. skewing said slit of light relative to the axis of curvature prior to scanning the transparency, the degree of skewing being a function of the extent and direction of lateral displacement;

c. restoring the resulting image-bearing light slit to parallelism with said axis of curvature subsequent to scanning the transparency;

d. optically rotating the image-bearing light slit into an image plane perpendicular to said axis of curvature so as to form, as the transparency is scanned, a radial pattern of scanning slit images each with its infinity or horizon point at the center of the pattern and with the slit image produced by scanning the transparency in that direction which coincides with said line of lateral displacement being disposed on a first axis and the slit image produced by scanning that portion of the transparency which extends perpendicular to said line of lateral displacement disposed along a second axis perpendicular to said first axis;

e. performing a Scheimpflug correction on said pattern with the correction axis aligned with said first axis, the amount of correction being a function of the extent of lateral displacement;

f. performing an anamorphic distortion on the result of preceding step (*e*), as a function of the extent of lateral displacement and with the magnification axis of the anamorphic distortion along said second axis; and g. rotating said resulting slit images into mutual parallelism.

2. A method according to claim 1 wherein there is a displacement in altitude as well as lateral displacement between the first and second perspective points, the method including the further step of anamorphically distorting said radial pattern to effect apparent altitude displacement.

3. A method according to claim 2 wherein said further step is performed subsequent to step (*f*).

4. The method of claim 1 wherein said function of the extent and direction of lateral displacement is a function which varies directly according to the extent of lateral displacement and sinusoidally according to the direction of lateral displacement.

5. The method of claim 1 wherein said function of the extent and direction of lateral displacement is a function of the product of the cosine of the scan angle relative to a plane perpendicular to the line of lateral displacement of the first perspective point from the second perspective point and the arctan of the distance of displacement of the simulated viewpoint from the film viewpoint divided by the altitude of the film viewpoint.

6. A method of recording a full 360° panoramic scene on film comprising the steps of:

rotating a right-angle reflector through 360° to completely scan the scene to be recorded, said reflector having its input axis substantially perpendicular to its axis of rotation and arranged to reflect a continuously changing slit image for forming a full 360° radial image pattern of the scene;

disposing film sensitive to said slit image in the form of a partial cylinder enclosing less than 360°;

orienting the continuously changing slit image which forms the full 360° radial image pattern as slit images which are parallel with the axis of curvature of said cylindrically curved film and which rotate around said axis of curvature; and directing said rotating and parallel slit image onto a segment of said cylindrically disposed film to record a full 360° panoramic scene on a segment of film disposed as a partial cylinder of less than 360°.

7. A panoramic projector to project from an image-bearing transparency a scene having an apparent perspective point laterally displaced from that at which the image was recorded on the transparency, comprising:

a. a cylindrical transparent gate to support the transparency;

b. means spaced radially on one side of said gate to scan a transparency image supported by said gate with a slit of illumination parallel to the longitudinal axis of said cylindrical gate;

c. means to tilt said slit of light prior to scanning said transparency image supported by said gate, the amount of tilt being a function of the extent and direction of lateral displacement;

d. means spaced radially on the other side of said gate to track said scanning slit of light and to orient the resulting image-bearing slit of light in a plane perpendicular to said longitudinal axis so that, as said slit scans said transparency supported by said gate, a radial pattern of slit images is formed with the infinity or horizon points of all images at its center;

e. means to remove the tilt of said image-bearing slit of light;

f. scanning means synchronized with the forming of said radial image pattern to track said perpendicularly oriented image-bearing slit and orient it to parallelism with said longitudinal axis for projection on a curved screen;

g. means, interposed between said means to remove the tilt and said synchronized scanning means, to perform a Scheimpflug correction; and h. means, interposed between said Scheimpflug means and said synchronized scanning means, to perform an anamorphic distortion.

8. The invention according to claim 7 wherein said means to track and orient said image-bearing slit of light is disposed radially inwardly of said cylindrical gate and comprises:

a. a right angle reflecting means mounted for rotation about said longitudinal axis; and b. means for rotating said reflecting means.

9. The invention according to claim 8 wherein said means for rotating said reflecting means is a scan drive motor connected through gearing to rotate said reflecting means at a selected angular rate of $\omega$.

10. The invention according to claim 9 wherein said means to scan said transparency image supported by said gate with a slit of illumination comprises:

a. means to generate a slit of light;

b. means rotatable about said gate to image said generated slit of light on said transparency image; and c. means to rotate said rotatable means at said selected angular rate of ω.

11. The invention according to claim 10 wherein said means to rotate said rotatable means comprises said scan drive motor connected through gearing to said rotatable means.

12. The invention according to claim 10 wherein said generated slit of light is generated perpendicularly to and along the axis of said gate, and wherein said rotatable means comprise:

a. a Pechan prism disposed remotely from said gate with its optical axis coincident with the axis of said gate and mounted for rotation about said coincident axis;

b. a first right-angle reflector juxtaposed with said first Pechan prism in the optical path between said Pechan prism and said gate and oriented to reflect said slit of light into parallelism with said gate axis;

c. a second right-angle reflector disposed in the optical path between said first right-angle reflector and said gate and oriented to rotate said slit of light into perpendicularity with said gate axis;

d. a third right-angle reflector disposed in the optical path between said gate and said second right-angle reflector to reflect said slit of light into parallelism with said gate axis;

e. means mounted for rotation about said gate axis and supporting said first, second and third reflectors in the aforesaid spatial disposition and orientation;

f. means to rotate said support means at said selected angular scan rate ω; and g. means to rotate said Pechan prism at the rate of ω/2 to keep said slit of light aligned with, and stationary with respect to, said first reflector as it rotates.

13. The invention according to claim 12 wherein said means to tilt comprise means to add to said Pechan prism position an angular amount equal to one-half the required tilt and wherein said means to remove said tilt comprise:

a. a second Pechan prism;

b. means to rotate said second Pechan prism at the rate ω/2; and c. means to subtract from the position of said second Pechan prism an angular amount equal to the amount added to the first-mentioned Pechan prism.

14. The invention according to claim 13 wherein said means to rotate said first and second Pechan prisms at the rate ω/2 comprise said scan drive motor connected through differential gearing to said Pechan prisms, and said means to add and means to subtract comprise a servo motor, whose position is controlled in accordance with said function, coupled to said gearing to provide a second differential input.

15. The invention according to claim 13 wherein said transparency is framed strip film and further including means to move the film into and out of said gate, said film-moving means comprising:

a. means to rotate said gate;

b. supply and take up means to transport film to and from said gate;

c. means to cause said scanning means to scan at said selected angular rate ω plus the rate of rotation of said gate; and d. means to add to said first and subtract from said second Pechan prism, one-half of said angular rate ω.

16. The invention according to claim 10 wherein said slit of light is generated parallel to said gate axis and said rotatable means comprise:

a. a Pechan prism rotatable about said gate axis;

b. first right-angle reflection means to reflect said slit of light into parallelism with said gate axis;

c. a second right-angle reflecting means to reflect said slit of light into perpendicularity with said gate axis;

d. a mirror coaxially surrounding said gate;

e. third reflecting means to reflect the slit of light from said second right-angle reflector means onto said mirror;

f. annular lens means coaxially disposed between said gate and mirror to image the slit reflected from said mirror onto said gate;

g. rotatable support means to support said first, second and third reflecting means for rotation about said axis;

h. means to drive said support means at the desired angular scan rate ω; and i. means to drive said Pechan prism at an angular rate of ω/2.

17. The invention according to claim 16, further including means to move film into and out of said gate comprising means rotatable about said film gate axis, said means containing an endless loop of film and having guides to feed film from said loop onto said gate and to return film coming from said gate to said loop as said means rotates about said gate axis.

18. The invention according to claim 17 wherein said mirror and lens contain openings providing a passageway for film to be supplied to and taken from said gate.

19. The invention according to claim 16 wherein said means to tilt comprises a second Pechan prism and means to position said second prism, and said means to remove said tilt comprises a third Pechan prism and means to drive said third prism.

20. The invention according to claim 19 wherein said second and third prisms are driven in opposite directions by a common servo drive motor.

21. The invention according to claim 10 and further including means to cause said slit to be illuminated only when scanning the frame of film to be displayed.

22. The invention according to claim 21 wherein 360° of image information is stored on film occupying 180° on said gate and said means to cause said slit to be illuminated only when scanning said frame to be displayed comprises:

a. first means providing an output pulse for each 180° of film;

b. a first flip-flop having its trigger input connected to said first output;

c. a second means to provide a second output for each 180° of scan motion;

d. a second flip-flop having its trigger input connected to said second output;

e. a first AND gate having as inputs the true outputs of said first and second flip-flops;

f. a second AND gate having as inputs the not-true outputs of said first and second flip-flops;

g. an OR gate having the outputs of said first and second AND gates as inputs; and h. light control means operative on said slit generating means and responsive to the output of said OR gate.

23. The apparatus of claim 7 wherein said function of the extent and direction of lateral displacement is a function which varies directly according to the extent of lateral displacement and sinusoidally according to the direction of lateral displacement.

24. The apparatus of claim 7 wherein said function of the extent and direction of lateral displacement is a function of the product of the cosine of the scan angle relative to a plane perpendicular to the line of lateral displacement of the first perspective point from the second perspective point and the arctan of the distance of displacement of the simulated viewpoint from the film viewpoint divided by the altitude of the film viewpoint.

25. In a panoramic projection system having means to support an image-bearing transparency, means to scan the image periodically with a slit of light, means to project the resulting modulated light slit on a curved screen, and means to cause said projected image to scan across said screen, apparatus for altering the image as projected to simulate a display viewing point laterally displaced from the actual or recording viewing point of the transparency, comprising:

a. means to tilt the slit of light prior to scanning the image such that the degree of tilt is a function of the extent and direction of lateral displacement;
b. means to remove the tilt of the resulting image-modulated light slit after the image has been scanned;
c. means to rotate said modulated slit of light into an image plane such that, as the image is scanned, a radial pattern is formed at said plane with the horizon or infinity point of all slit images at its center and with the slit image produced by scanning a portion of the image in the direction of lateral displacement disposed along a first axis of said pattern and the slit image produced by scanning a portion of the image perpendicular to the direction of displacement disposed along a second axis perpendicular to said first axis;
d. means to perform a Scheimpflug correction on said pattern with the correction axis aligned with said first axis, the amount of correction being a function of the extent of lateral displacement; and
e. anamorphic distortion means operable on the corrected output pattern of said Scheimpflug means with the magnification axis of the anamorphic correction aligned with said second axis and the amount of magnification a function of the extent of lateral displacement.

26. The invention according to claim 25 wherein said means to tilt said light slit comprises a first Pechan prism and said means to remove the tilt of said image-modulated light slit comprises a second Pechan prism.

27. The apparatus of claim 25 wherein said function of the extent and direction of lateral displacement is a function which varies directly according to the extent of lateral displacement and sinusoidally according to the direction of lateral displacement.

28. The apparatus of claim 25 wherein said function of the extent and direction of lateral displacement is a function of the product of the cosine of the scan angle relative to a plane perpendicular to the line of lateral displacement of the first perspective point from the second perspective point and the arctan of the distance of displacement of the simulated viewpoint from the film viewpoint divided by the altitude of the film viewpoint.

29. A projector to project a full 360° panoramic view of a scene stored on a frame of film comprising:

a. a cylindrical transparent film gate to support the film, said gate having a circumference greater than the length of a frame of film and wherein the frame of film when supported on said gate will subtend X degrees;
b. means on one side of said gate to scan said frame of film with a slit of illumination parallel to the axis of said cylinder;
c. means on the other side of said gate to track said scanning slit of light and to orient the resulting image-bearing slit of light in a plane perpendicular to the cylinder axis so that as said slit of light scans said frame of film a radial image pattern is formed;
d. means to adjust the angular rate of forming said radial image pattern with respect to the angular rate of scanning said frame of film by a factor of 360 divided by X to cause a full 360° radial image pattern to form during the scan of the frame of X degrees; and
e. scanning means synchronized with forming of said radial image pattern by said image-bearing slit of light at said adjusted rate to track said perpendicular oriented image-modulated slit of light and return it to parallelism with the cylinder for projection on a cylindrical screen.

30. The invention according to claim 29 wherein X is 180° such that the angular rate of forming said radial image is double the angular scanning rate.

31. The invention according to claim 30 and further including means to cause said slit to be illuminated only when scanning the 180° containing said film frame.

32. The invention according to claim 29 wherein said means to track and image said slit is on the inside of said cylindrical gate and comprises a right-angle reflecting means mounted for rotation about said cylinder axis and means to rotate said reflecting means.

33. The invention according to claim 32 wherein said reflecting means is a prism.

34. The invention according to claim 33 wherein said means to increase rotation is a Pechan prism with its axis of rotation on a line perpendicular to said radial image pattern and passing through its center and means to rotate said prism at a selected angular rate of $\omega$ times 360 divided by two X where $\omega$ is the angular rate at which said scanning means is scanning said frame of film.

35. The invention according to claim 29 wherein said means to scan said frame of film with an illuminated slit comprise:

a. means to generate a slit of light; and
b. means rotatable about said gate to image said slit on said frame of film supported by said gate.

36. The invention according to claim 35 wherein said slit of light is generated perpendicular to and along the axis of said gate and said rotatable means comprise:

a. a Pechan prism rotatable about the axis of said cylindrical gate and spaced from said gate along said axis;

b. a first right-angle reflector to reflect said slit of light into parallelism with said axis;

c. a second right-angle reflector to return said slit of light to perpendicularity to said axis;

d. a third right-angle reflector aligned with said gate to reflect said slit of light into parallelism with said axis;

e. means to support said first, second and third reflectors, said means being mounted for rotation about said axis;

f. means to rotate said support means and the reflectors supported thereon at said selected angular scan rate $\omega$; and g. means to rotate said Pechan prism at the rate $\omega/2$ to keep said slit aligned with said reflector as it rotates.

37. The invention according to claim 36 further including means to move film to and from said gate, whereby panoramic motion pictures may be projected.

38. The invention according to claim 36 wherein said means to move film comprise: means to rotate said gate; and supply and take up means to supply film to and take up film from said gate.

39. The invention according to claim 35 wherein said slit of light is propagated perpendicular to and along said axis and said rotatable means comprise:

a. a Pechan prism rotatable about said axis;

b. first right-angle reflection means to reflect said slit into parallelism with said axis;

c. a second right-angle reflecting means to reflect said slit into perpendicularity to said axis;

d. a mirror surrounding said gate;

e. third reflecting means to reflect the slit of light output of said second means onto said mirror;

f. annular lens means to image the slit of light reflected from said mirror onto said gate;

g. rotatable support means to support said first, second and third reflecting means for rotation about said axis;

h. means to drive said support means at a selected angular scan rate $\omega$; and i. means to drive said Pechan prism at an angular rate of $\omega/2$.

40. The invention according to claim 36 further including means to move film to and from said gate whereby panoramic motion pictures may be projected.

41. The invention according to claim 40 wherein said means to move film comprise means rotatable about said film gate axis, said means containing an endless loop of film and having guides to feed film from said loop onto said gate and to return film coming from said gate to said loop as said means rotates about said gate axis.

42. The invention according to claim 41 wherein said mirror and lens contain openings to allow film to be supplied to and taken from said gate.

43. The invention according to claim 29 further including:

a. means to tilt said slit of light prior to scanning said frame of film;

b. means to remove said tilt after said frame of film is scanned;

c. Scheimpflug correction means interposed in the optical path between said means to adjust the angular rate of forming and said synchronized scanning means;

d. anamorphic distortion means interposed in the optical path between said Scheimpflug means and said synchronized scanning means; and e. means to control said tilting means, said means to remove said tilt, said Scheimpflug means and said anamorphic means as a function of lateral displacement.

44. A method of projecting a full 360° panoramic view of an image recorded on a transparency, comprising the steps of:

a. disposing the transparency in a curved configuration with a first axis of the image on said transparency parallel to the axis of curvature of said transparency, and the radius of curvature of said transparency such that the dimension of the image on said transparency perpendicular to said first axis subtends an angle of X degrees, where X is less than 360°;

b. generating on one side of and directing toward said transparency a slit of light parallel to, and rotating about, said axis of curvature for producing an image-modulated slit of light on the other side of said transparency;

c. optically rotating the image-modulated light slit in an image plane perpendicular to said axis of curvature so as to form, as the transparency is scanned, a 360° radial pattern of image-modulated light slits each with its horizon or infinity point at the center of the pattern;

d. adjusting the rate of said optical rotation of said image-modulated light slit with respect to the rotating of said slit of light about said axis of curvature by a factor of 360 divided by X to cause a full 360° radial pattern to form during X degree scan of the transparency; and e. restoring the slit images of said pattern to mutual parallelism for projection.

45. A method of projecting a panoramic view, including a full 360° view of an image recorded on a transparency comprising the steps of:

disposing the transparency in a curved configuration with a first axis of the image on said transparency parallel to the axis of curvature of said transparency and the radius of curvature of said transparency such that the dimension of the image on said transparency which is perpendicular to said first axis subtends an angle less than 360°;

scanning said transparency with slit of light parallel to, and rotating about, said axis of curvature for producing an image-modulated slit of light;

optically rotating said image-modulated light slit in an image plane perpendicular to said axis of curvature so as to form, as the transparency is scanned, a radial pattern, up to and including a 360° radial pattern, of image-modulated light slits each with the horizon or infinity point at the center of the pattern;

adjusting the rate of said optical rotation of said image-modulated light slit with respect to the rate of scanning said transparency such that the radial pattern of image-modulated light slits formed by scanning the image on the transparency covers a sector of angular units equivalents to the angular units represented by the panoramic image on said transparency; and restoring the radial pattern of image-modulated light slits to mutual parallelism for projection.

46. A panoramic projector to project a view, including a full 360° view of a scene stored on a frame of film comprising:

a curved transparent film gate to support the film, said gate having a circumference greater than the length of a frame of film and wherein the frame of film when supported on said gate will subtend an angle less than 360°;

means on one side of said gate to scan said frame of film with a slit of illumination parallel to the axis of said cylinder;

means on the other side of said gate to track said scanning slit of light and to orient the resulting image-modulated slit of light in a plane perpendicular to the axis of curvature of said gate so that as said slit of light scans said frame of film a radial image pattern, up to and including a 360° radial image pattern, is formed, each of said image-modulated light slits forming said radial pattern with the horizon or infinity point at the center of the pattern;

means to adjust the angular rate of forming of said radial image with respect to the angular rate of scanning said frame of film such that the radial pattern of image-modulated light slits formed by scanning the frame of films covers a sector of angular units equivalent to the angular units represented by the panoramic image on said frame of film; and scanning means synchronized with the forming of said radial image at said adjusted rate to track said perpendicular oriented image-modulated slit of light and rotate it to parallelism for projection on a curved screen.

47. A camera to record a panoramic scene up to and including a full 360° scene, on a frame of film comprising:

a rotating right-angle reflector to scan the scene to be recorded having its input axis substantially perpendicualr to its axis of rotation and arranged to reflect a continuously changing slit image which forms a radial image pattern of the scene to be recorded;

curved transparent film gate means; and rotating optical means to orient the continuously changing slit image comprising the radial image pattern into parallelism with the axis of curvature of said gate means and to direct said parallel slit image from said radial pattern onto film supported by said film gate means.

48. A panoramic camera to record a full 360° scene on a frame of film comprising:

a rotating right-angle reflector for scanning the scene to be recorded having its input axis perpendicular to its axis of rotation and arranged to reflect a continuously changing slit image to form a 360° radial image pattern of the scene to be recorded wherein the horizon of said scene is at the center of said radial pattern;

cylindrically curved transparent film gate means for supporting film sensitive to said slit image as a partial cylinder;

rotating optical means to orient the continuously changing slit image comprising the radial image pattern into parallelism with the longitudinal axis of said cylindrically curved film gate means and to direct said parallel slit images from said radial pattern onto said film supported by said film gate means; and means to regulate the rotation rate of said optical means such that a full 360° radial image pattern is oriented and then recorded on a segment of said film supported by said cylindrically curved film gate means which segment is less than a full 360° cylinder.

49. A method of recording a panoramic scene, up to and including a full 360° scene on film comprising the steps of:

rotating a right-angle reflector to scan the scene to be recorded, said reflector having its input axis substantially perpendicular to its axis of rotation and arranged to reflect a continuously changing slit image for forming a radial image pattern of the scene;

disposing film sensitive to said slit image as a partial cylinder enclosing less than 360°;

orienting the continuously changing slit image which forms the radial image pattern as slit images which are parallel with the axis of curvature of said film and when rotate around said axis of curvature; and directing said rotating parallel slit images on a segment of said cylindrically disposed film.

* * * * *

UNITED STATES PATENT OFFICE
CERTIFICATE OF CORRECTION

PATENT NO. : 3,832,046

DATED : August 27, 1974

INVENTOR(S) : Richard A. Mecklenborg

It is certified that error appears in the above--identified patent and that said Letters Patent are hereby corrected as shown below:

Col. 11, line 36, change "te" to --the--.

Col. 22, line 66 (claim 45) "equivalents" should be --equivalent--.

Col. 24, line 43 (claim 49) "when" should be --which--.

Signed and Sealed this

*sixteenth* Day of *September 1975*

[SEAL]

*Attest:*

RUTH C. MASON
*Attesting Officer*

C. MARSHALL DANN
*Commissioner of Patents and Trademarks*